United States Patent [19]
Okada et al.

[11] Patent Number: 5,672,329
[45] Date of Patent: Sep. 30, 1997

[54] MANGANESE OXIDES PRODUCTION THEREOF, AND USE THEREOF

[75] Inventors: Masaki Okada, Tokuyama; Takashi Mouri, Hikari, both of Japan

[73] Assignee: Tosoh Corporation, Shinnanyo, Japan

[21] Appl. No.: 584,094

[22] Filed: Jan. 11, 1996

Related U.S. Application Data

[63] Continuation of Ser. No. 96,817, Jul. 28, 1993, abandoned.

[30] Foreign Application Priority Data

| Jul. 29, 1992 | [JP] | Japan | 4-220893 |
| Nov. 30, 1992 | [JP] | Japan | 4-320732 |
| Nov. 30, 1992 | [JP] | Japan | 4-320733 |
| Dec. 3, 1992 | [JP] | Japan | 4-324467 |
| Dec. 3, 1992 | [JP] | Japan | 4-324469 |
| Dec. 9, 1992 | [JP] | Japan | 4-329411 |

[51] Int. Cl.$^6$ ............ C01G 45/00; C01G 51/00; C01G 9/00; C01F 1/00
[52] U.S. Cl. .............................. 423/599; 423/594
[58] Field of Search ............. 423/594, 599, 423/205, 206; 429/224

[56] References Cited

U.S. PATENT DOCUMENTS

| 3,905,917 | 9/1975 | Nishino et al. | 423/212 C |
| 4,049,790 | 9/1977 | Horowitz et al. | 423/599 |
| 4,246,253 | 1/1981 | Hunter | 423/605 |
| 4,312,930 | 1/1982 | Hunter | 429/191 |
| 4,388,294 | 6/1983 | Poeppelmeier et al. | 423/599 |
| 4,520,005 | 5/1985 | Yao | 423/599 |
| 5,169,736 | 12/1992 | Bittihn et al. | 429/194 |

FOREIGN PATENT DOCUMENTS

| 0470492 | 2/1992 | European Pat. Off. | |
| 55-100224 | 7/1980 | Japan . | |
| 62-270420 | 11/1987 | Japan | 423/599 |
| 3-112816 | 5/1991 | Japan | 423/599 |
| 2216511 | 10/1989 | United Kingdom | 423/605 |

OTHER PUBLICATIONS

Database WPI, Week 9102, Derwent Publications Ltd., London, AN91–010961 & JP-A-2 283 621 Agency of Ind. Sci. Tech., no date.

Patent Abstracts of Japan, vol. 12, No. 155, (C-494) (3002) 12 May, 1988 & JP-A-62 270 420 Agency of Ind. Sci. Tech.

Chemical Abstracts, vol. 115, No. 20, 18 Nov., 1991, Columbus, Ohio, U.S. Abstract No. 221589u, p. 962, & JP-A-03 112 816.

Chemical Absttracts, vol. 111, No. 16, 16 Oct., 1989, Columbus, Ohio, US.; Abstract No. 138002u, Ohzuku Tsutomu, p. 237; & Chem. Express vol. 4, No. 8, 1989, pp. 487–490.

Yamamoto, N., et al., "Preparation . . . Lausmanite spinel," Funtai Oyobi Funmatsuyakin, 30(2), pp. 48–54, 1983, no month.

Goolikov, Y., et al, "Study of . . . cobalt–manganese–oxygen system", Protessessakh Vosstanov, Met., 1978, pp. 137–141, no month.

*Primary Examiner*—Steven Bos
*Attorney, Agent, or Firm*—Foley & Lardner

[57] ABSTRACT

A manganeses oxide is provided which is represented by the general formula $A_xMn_2O_4 \cdot nH_2O$, where A is Zn, Mg, Ca, or Co; and if A is Zn, $0<x<1$ and $n=0$; if A is Mg or Ca, $0 \leq x \leq 1$ and $0 \leq n \leq 20$; and if A is Co $0<x \leq 1$ and $n=0$. The manganese oxide has a spinel type, a layer type, or amorphous type both crystal structures of layer type and spinel type. The manganese oxide is produced by oxidizing a mixture of a hydroxide of A (where A is Zn, Mg, Ca, or Co) and manganese hydroxide in a molar ratio 1:2 in an alkali solution, and then removing A by oxidation treatment. A lithium secondary battery is provided by use of a kind of the above manganese oxide for the positive electrode, exhibiting high output with high energy density and with satisfactory reversibility in charge-discharge cycle.

9 Claims, 20 Drawing Sheets

MANGANESE OXIDES PRODUCTION THEREOF, AND USE THEREOF

This application is a continuation of application Ser. No. 08/096,817, filed Jul. 28, 1993, now abandoned.

BACKGROUND OF THE INVENTION

1. Field of the Invention

The present invention relates to a novel manganese oxides, a process for production of the magnesium oxide, and a lithium secondary battery employing the manganese oxide. More particularly, the present invention relates to a novel manganese oxides represented by the general formula $A_xMn_2O_4 \cdot nH_2O$ (where A is Zn, Mg, Ca, or Co; and if A is Zn, $0<X<1$ and $n=0$; if A is Mg or Ca, $0 \leq x \leq 1$ and $0 \leq n \leq 20$; and if A is Co, $0<x \leq 1$ and $n=0$), and having a crystal structure of spinel type, a layer type, or a spinel-and-layer combination type. The present invention also relates to a process for producing the novel manganese oxides, and use of some of the manganese oxides for a positive electrode of a lithium secondary battery.

The manganese oxide having a spinal type or a layer type crystal structure has paths which enable migration of ions in the crystal structure, therefore being promising as a host compound.

Additionally, the manganese atom is capable of varying its valency continuously and reversibly, and therefore it is promising as a material exhibiting both oxidation-reduction ability and host compound function. Accordingly, the manganese oxides having such properties are attracting attention for use for an active battery material, a catalyst, an adsorption material, and a magnetic material.

On the other hand, a lithium secondary battery is promising as a new secondary battery because of its high output and high energy density.

2. Description of the Related Art

The manganese oxides have various compositions and various crystalline states. For example, manganese dioxide has crystal states of α type, β type, γ type, λ type, δ type, etc.

The β type manganese dioxide forms a single chain by linking of $MnO_2$ octahedrons by sharing the edges three-dimensionally in the C-axis direction, and thereby develops a tunnel structure of (1×1) toward the (110) direction. Similarly, the γ type manganese dioxide forms double chains of $MnO_6$ octahedron and the double chains are connected by sharing of the edges three-dimensionally in the C axis direction and has a tunnel structure of (1×2) along the (110) direction. α type manganese dioxide has a tunnel structure of (2×2) and (3×2) developed two-dimensionally.

On the other hand, the λ type manganese dioxide has a tunnel structure formed by three-dimensional linking of (1×1)-tunnels and has a crystal state assignable to a spinel type crystal structure.

The spinel type crystal structure has sites for cation at the octahedron position and the tetrahedron position of the close-packed oxygen atoms, and the sites are connected three-dimensionally.

$ZnMn_2O_4$ having a spinel type crystal structure is a compound in which Mn atoms occupy the octahedron sites and Zn atoms occupy the tetrahedron sites. If Zn is removed from this compound with the spinel type crystal structure kept unchanged, sites for accepting cation is formed in the crystal structure, and thereby the Mn atom is capable of varying its valency continuously and reversibly. Therefore the compound can be a material useful as a host compound.

In particular, if Zn is completely eliminated from this compound, an λ type manganese dioxide is obtained in which ⅔ of the cation sites are occupied by manganese atoms and ⅓ of the cation sites are unoccupied and vacant, and the cation-holding capacity becomes maximum. However, Zn has never been eliminated from $ZnMnO_2$ with its spinel structure maintained. Therefore, $ZnMn_2O_4$ is used, as it is, only for limited application, for example, a raw material of ferrite and has not been used as a host compound.

Although many other studies have been made on synthesis of λ type manganese dioxide of spinel type structure, the inherent function thereof has not been exhibited sufficiently. For example, the λ type manganese dioxide of the spinel structure reported so far is synthesized by heating a manganese spinel compound at a high temperature and treating the heated product with an acid.

In Japanese Patent Application. Laid-Open No 55-100224, manganese dioxide of spinel crystal structure is synthesized by mixing, in a solid state, β type manganese dioxide as a precursor and powdery $Li_2CO_3$ in a ratio of Li:Mn=1:2 (molar ratio), heating the mixture in the air at 850° C., treating the resulting $LiMn_2O_4$ with sulfuric acid to remove Li. The inventors of the present invention, however, have found that the manganese dioxide of spine/structure obtained by the above procedure is a manganese compound of a proton-type spinel crystal structure in which Li is replaced by proton by ion-exchange since Li is removed by treating the precursor $3LiMn_2O_4$ with sulfuric acid. Accordingly, the compound is useful in only limited fields in comparison with inherent use of host compounds.

In Japanese Patent Application Laid-Open No. 62-270420, manganese dioxide of a spinel structure is synthesized by mixing an aqueous magnesium chloride solution and an aqueous manganese chloride solution in a ratio of Mg:Mn=1:2 (molar ratio), adding ammonia to the mixture to form mixed hydroxides of Mg and Mn, collecting the product by filtration, heating the collected product at 700° C., and treating the resulting $MgMn_2O_4$ with nitric acid to remove Mg. However, with this product also, the inherent function of manganese dioxide of the spinel structure is not exhibited from the same reason as mentioned above regarding $LiMn_2O_4$.

δ type manganese dioxide is in a crystal state having $MnO_6$ octahedron linked two-dimensionally by sharing the edges, and has a layer structure in which Mn atoms are arranged in alternate layers of oxygen in hexagonal close-packed state.

Manganese dioxide of a layer structure is found in nature as birnessite. As artificial birnessite, sodium birnessite is known which is synthesized by neutralizing an aqueous $Mn^{2+}$ solution with sodium hydroxide, and oxidizing the resulting manganese hydroxide by air at a low temperature of about 0° C. This oxide has a layer structure in which Mn atoms are arranged in alternate layers of hexagonally close-packed oxygen atoms, as described above. The layer structure is formed by electrostatic repulsion between oxygen atoms in Mn-lacking layers, and is usually stabilized by canceling the electrostatic repulsion by insertion of univalent cation such as sodium in the Mn-lacking layer. On insertion of the cation, water molecules are partly incorporated as hydration water.

Thus the manganese oxide of a layer structure is capable of accepting cation between two layers formed by electrostatic repulsion between oxygens. Further, the layer structure is considered to be capable of accepting and releasing cation. Therefore, it is expected as a promising host compound.

With prior art technique, however, the manganese oxide of layer structure needs to be synthesized at a low temperature of about 0° C. as described above, which is not suitable for industrial production. By this reason, the manganese oxide of layer structure has not been practically used as a host compound.

To solve this problem, U.S. Pat. No. 4,520,005 discloses a birnessite having Bi or Pb inserted between the layers which is synthesized at an ordinary temperature in the co-presence of Bi ion or Pb ion with sodium ion in the solution. This disclosure intends to use the birnessite to a positive-electrode-active material of an alkali secondary battery, but it involves a problem that the production cost is high because of the use of expensive Bi or Pb.

With such a background, the manganese oxide of layer structure has not been practically used as a host compound in spite of expectation.

δ type manganese dioxide also exhibits a layer structure. However, it is considered as an aggregate of fine crystals having layer structure. δ type manganese dioxide is prepared, according to a generally known method, by mixing potassium permanganate with hydrochloric acid and heating the resulting precipitate at 250° C. However, known stable δ type manganese dioxide exists only in a narrow range of the oxidation degree of manganese from about 1.5 to about 1.8. This low oxidation degree of manganese prevents the material from exhibiting the performance expected form the crystal structure.

On the other hand, with the progress of wireless electronic devices, development of a secondary battery of small size, light weight, and high energy density is strongly desired.

To satisfy this desire, a lithium battery was proposed which employs, as the negative electrode, lithium or a material capable of occluding or releasing lithium. Oxides and sulfides of molybdenum, vanadium, niobium, titanium, nickel, cobalt, etc. were mainly studied as the positive electrode for the lithium secondary battery, but has not been practically used except for limited oxidesorsulfides. Manganese oxide has been also studied as a promising positive electrode material. However, the manganese dioxide is applied only to the positive electrode of a lithium primary battery and has not been practically used as the positive electrode of a lithium secondary battery.

Manganese dioxide, when used for the positive electrode of a lithium secondary battery, expands or shrinks in the crystal structure by incorporation of lithium ion into and release thereof from the crystal structure on charge and discharge. Therefore the manganese dioxides hitherto used for lithium primary batteries collapse in the crystal structure by the expansion and shrink of the crystal structure to result in remarkable drop of the discharge capacity, thereby are not applicable to secondary battery. Therefore manganese oxide is required which has crystal structure not collapsed on cycles of incorporation-release of lithium ion in crystal structure.

With such a background, manganese oxides having lithium-receiving sites connected in a tunnel-like state in the crystal structure, such as of spinel structure and layer structure, are investigated in recent years.

The manganese oxide of spinel type crystal structure have already been studied extensively. For example, the aforementioned $LiMn_2O_4$ and the like have been proposed as the positive electrode material. The inventors of the present invention noticed that the manganese oxides of spinel type crystal structure disclosed so far are low in output power and usage percent, and are still unsatisfactory in reversibility in charge and discharge.

On the other hand, a study on manganese oxide of layer type crystal structure or of δ type crystal structure in which lithium ion is considered to migrate more easily in the solid phase than in the one of spinal type crystal structure is almost none since a suitable material for the positive electrode of the secondary battery has not been obtained therefrom.

SUMMARY OF THE INVENTION

The present invention intends to provide a novel manganese oxide which has a spinel type crystal structure, layer type structure, and a spinel-and-layer type crystal structure, and is promising material as a host compound for an active battery material, a catalyst, and adsorbent, and a magnetic material.

The present invention also intends to provide a process for producing the above manganese oxide.

The present invention further intends to provide a lithium secondary battery which employs some kind of the above oxides as the positive electrode, and exhibiting high output power, high energy density, and satisfactory reversibility of charge-discharge cycles.

The manganese oxides of the present invention has a crystal structure of spinel type, a layer type, or a spinel-and-layer combination type, and is represented by the general formula $A_xMn_2O_4 \cdot nH_2O$ (where A is Zn, Mg, Ca, or Co; and if A is Zn, $0<X<1$ and n=0; if A is Mg or Ca, $0 \leq x \leq 1$ and $0 \leq n \leq 20$; and if A is Co, $0<x \leq 1$ and n=0.

The process for producing the manganese oxide of the present invention comprises oxidizing an aqueous alkaline solution containing a mixture composed of a hydroxide of A (A is Zn, Mg, Ca, or Co) with of manganese hydroxide in a molar ratio of 1:2, and treating a resulting compound by oxidation.

The lithium secondary battery of the present invention employs one or more kinds of the above manganese oxides for the positive electrode.

DETAILED DESCRIPTION OF THE PREFERRED EMBODIMENT

Figure 1:
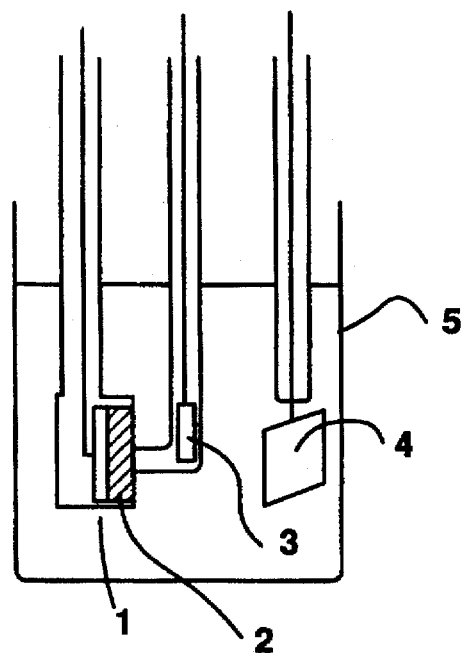
FIG. 1 is a cross-sectional view of a battery employed in Examples and Comparative Examples.

A manganese oxide of spinel type crystal structure represented by the general formula $Zn_xMn_2O_4$ (0<x<1) was found to be produced by removing Zn from $ZnMn_2O_4$ by oxidation treatment of $ZnMn_2O_4$ of a spinel type crystal structure. A lithium secondary battery exhibiting high output, high energy density, and satisfactory reversibility of charge-discharge cycles is obtained by use of the manganese oxide as the positive electrode. In particular, starting from $ZnMn_2O_4$ having a BET specific surface area of 10 $m^2/g$ or more, manganese dioxide of spinel type structure having a BET specific surface area of not less than 100 $m^2/g$ is obtained which is highly suitable for lithium secondary battery because of high out put, high energy density and satisfactory reversibility of change-discharge cycles.

A manganese oxide having a novel layer structure having unknown novel interplanar spacing was found to be synthesized by oxidizing a mixture of magnesium hydroxide and manganese hydroxide in a Mg:Mn molar ratio of 1:2 in an aqueous alkali solution, The interplanar spacing had not been known for an oxide of Mg:Mn molar ratio of 1:2. The interplanar spacing can readily be determined from the X-ray diffraction angle according to Bragg's equation. By removing Mg by oxidation treatment, a manganese oxide having a layer structure and represented by the general formula $Mg_xMn_2O_4.nH_2O$ (0<x<1, 0≦n≦20) was found to be obtained. With this magnesium oxide used for the positive electrode, a lithium secondary battery was constructed which exhibits high output, high energy density, and satisfactory reversibility of charge-discharge cycles.

Another novel manganese oxide having unknown amorphous crystal structure was found to be synthesized by oxidizing a mixture of calcium hydroxide and manganese hydroxide in a Ca:Mn molar ratio of 1:2 in an aqueous alkali solution. The amorphous crystal structure had not been known for an oxide of Ca:Mg molar ratio of 1:2. By removing Ca by oxidation treatment, a manganese oxide was obtained which has δ type crystal structure and represented by the general formula $Ca_xMn_2O_4.nH_2O$(0<x<1, 0≦n≦20). With this magnesium oxide used for the positive electrode, a lithium secondary battery was constructed which exhibited high output, high energy density, and satisfactory reversibility of charge-discharge cycles.

A manganese oxide of a novel layer-and-spinel type crystal structure was found to be synthesized by oxidizing a mixture of cobalt hydroxide and manganese hydroxide in a Co:Mn molar ratio of 1:2 in an aqueous alkali solution. By removing Co by oxidation treatment, a manganese oxide having a layer-and-spinel type crystal structure and represented by the general formula $Co_xMn_2O_4$ (0<x<1) was obtained. With this manganese oxide used for the positive electrode, a lithium secondary battery was constructed which exhibited high output, high energy density, and satisfactory reversibility of charge-discharge cycles.

As described above, the present invention relates to a novel manganese oxides having a crystal structure of spinel type, a layer type, a spinel-and-layer combination type or amorphous type, and being represented by the general formula $A_xMn_2O_4$ $nH_2O$ (where A is Zn, Mg, Ca, or Co; and if A is Zn, 0<X<1 and n=0; if A is Mg or Ca, 0≦x≦1 and 0≦n≦20; and if A is Co, 0<x≦1 and n=0), and also relates to a process for producing the novel manganese oxides, and a lithium secondary battery employing some of the manganese oxides for a positive electrode thereof.

The manganese oxides represented by the general formula $A_xMn_2O_4.nH_2O$ (where A is Zn, Mg, Ca, or Co; and if A is Zn, 0<X<1 and n=0; if A is Mg or Ca, 0≦x≦1 and 0≦n≦20; and if A is Co, 0<x≦1 and n=0) has ion migration paths and ion accepting sites in the crystal structure, and is promising as a host compound. Further, the manganese atom is capable of varying its valency continuously and reversibly, so that the manganese oxide is also promising as a material exhibiting both a oxidation-reduction ability and a host compound function.

The manganese oxide having a spinel type crystalline structure and being represented by the general formula $Zn_xMn_2O_4$ (0<x<1) is derived from a manganese oxide having a spinel type crystal structure and represented by $ZnMn_2O_4$ by oxidation treatment to remove Zn. In particular, starting from $ZnMn_2O_4$ having a BET specific surface area of 10 $m^2/g$ or more, manganese dioxide of spinel type structure having a BET specific surface area of not less than 100 $m^2/g$ is obtained which is assignable to λ type.

The starting material, $ZnMn_2O_4$, is a manganese oxide of a normal spinel type crystal structure, and has Mn atoms at the octahedron positions of close-packed oxygen atoms and Zn atoms at the tetrahedron position.

In the production of the spinel type crystalline structure by removal of Zn, it is important to oxidize mixed hydroxide of Mn and Zn in an aqueous alkali solution by aeration and oxidize the resulting $ZnMn_2O_4$. Specifically, to an aqueous solution containing a two-valent Mn salt and a Zn salt dissolved therein in a molar ratio of 2:1, an equal amount or more amount of an alkali solution is added, the resulting hydroxide is oxidized by aeration, and the obtained $ZnMn_2O_4$ is oxidized to achieve +4 valence of Mn. The obtained $ZnMn_2O_4$ may be heat treated to raise its crystallinity. The aeration oxidation is conducted by bubbling air and/or oxygen into the solution. The oxidation treatment for attaining +4 valence of Mn is conducted, for example, by chemical oxidation or electrochemical oxidation. Specifically, in one method, $ZnMn_2O_4$ is treated with a solution containing at least one oxidizing agent in an amount sufficient for oxidizing Mn to +4 valent. In another method, by using an electrolytic cell having an anode chamber and a cathode chamber separately, $ZnMn_2O_4$ is suspended in the anode chamber and is oxidized on the anode.

The oxidizing agent used for this oxidation is not specially limited. Any oxidizing agent may be used which is capable of oxidizing the Mn to +4 valence, including persulfate salts such as sodium persulfate, potassium persulfate, ammonium persulfate, etc., hydrogen peroxide, chlorine, and the like.

Hitherto treatment of $ZnMn_2O_4$ with a mineral acid or an organic acid has been investigated as a method of removal of Zn. In this method, Mn dissolution occurs in addition to Zn removal, which gives a γ type manganese dioxide without maintaining the spinel type crystal structure, or otherwise gives a proton type of spinel type crystal structure in which $H^+$ is introduced in place of Zn even though Zn is partially removed. Accordingly, the compound having host compound function which is the object of the present is not obtainable by acid treatment.

On the contrary, in the treatment of oxidizing Mn to +4 valence as in the present invention, the oxidation of Mn and the removal of Zn proceed simultaneously, giving manganese oxide having spinel structure from which Zn has been removed. Particularly in the case where $ZnMn_2O_4$ having a BET specific surface area of 10 $m^2/g$ or more is used, the resulting manganese oxide is of an λ type assignable to the spinel crystal structure, having a BET specific surface area of 100 $m^2/g$ or more.

The oxide, in the present invention, represented by the general formula $MgMn_2O_4 \cdot nH_2O$ ($0 \leq n \leq 20$) in which the Mg:Mn molar ratio is 1:2 has a crystal structure that has not ever been identified. The only one known $MgMn_2O_4$ having Mg:Mn ratio of 1:2 has a spinel type crystal structure. On the contrary, the manganese oxide of the present invention does not have the spinel type crystal structure, but has a layer structure having interplanar spacings of 7.14 angstrom, etc. like sodium birnessite. In the layer structure, Mn atoms are arranged in alternate layers of oxygen atoms of a hexagonal close-packed state.

In order to obtain the manganese oxide having Mg:Mn molar ratio of 1:2 of a layer structure, the important point is that a mixture of magnesium hydroxide and manganese oxide in a molar ratio of 1:2 is oxidized in an aqueous alkali solution. By oxidizing the hydroxide mixture in an aqueous alkali solution, the oxide of an Mg:Mn molar ratio of 1:2 having a layer structure is synthesizable although the detailed reason is not known. Since the Mg compound is inexpensive, and the synthesis is practiced at an ordinary temperature, the manganese oxide of a layer structure can be synthesized at low production cost.

The oxidation is conducted by aeration. Manganese hydroxide is oxidized by bubbling air and/or oxygen into the solution, giving manganese oxide having a layer structure combined with Mg.

The manganese oxide-represented by the general formula $Mg_xMn_2O_4 \cdot nH_2O$ ($0 \leq x < 1$, $0 \leq n \leq 20$) having a layer structure of the present invention is derived by removing a part or the whole of interlayer Mg atoms from the above manganese oxide represented by the general formula $MgMn_2O_4$ $nH_2O$ ($0 \leq n \leq 20$) having a layer structure, and has a structure having vacant sites for receiving cation between the layers.

The removal of Mg from $MgMn_2O_4 \cdot nH_2O$ ($0 \leq n \leq 20$) is achievable in the same manner as in synthesis of a manganese oxide represented by the general formula $Zn_xMn_2O_4$ ($0 < x < 1$) having a spinal type crystal structure by an oxidation treatment to oxidize Mn to +4 valence. Hitherto, mineral acid treatment has been proposed. This method, however, gives layered manganese oxide of proton type formed by replacing cation between the layers with proton, therefore the product being limited in its uses.

The oxide, in the present invention, represented by the general formula $CaMn_2O_4 \cdot nH_2O$ ($0 \leq n \leq 20$) in which the Ca:Mn molar ratio is 1:2 has a crystal structure that has not ever been identified. The only one known $CaMn_2O_4$ having Ca:Mn ratio of 1:2 has a spinal type crystal structure. On the contrary, the oxide of the present invention does not have the spinel type crystal structure, but has an amorphous structure exhibiting only weak X-ray diffraction peaks near the positions of X-ray diffraction corresponding to interplanar spacing of 4.8 and 3.1 angstroms without other diffraction peak and showing no specific crystalline symmetry, As already mentioned, the interplanar spacing is readily derivable from the position of X-ray diffraction peaks according to Bragg's equation.

In order to obtain the manganese oxide having Ca:Mn molar ratio of 1:2 of an amorphous structure, the important point is that a mixture of calcium hydroxide and manganese hydroxide in a molar ratio of 1:2 is oxidized in an aqueous alkali solution. By oxidizing the hydroxide mixture in an aqueous alkali solution, the oxide of a Ca:Mn molar ratio of 1:2 having an amorphous structure is synthesizable although the detailed reason is not known.

The oxidation is conducted by aeration in the similar way for producing above $MgMn_2O_4 \cdot nH_2O$. The hydroxide is oxidized by bubbling air and/or oxygen into the solution, giving manganese oxide in an amorphous structure combined with Ca.

The manganese oxide represented by the general formula $Ca_xMn_2O_4 \cdot nH_2O$ ($0 \leq x < 1$, $0 \leq n \leq 20$) having a δ type structure of the present invention is derived by removing a part or the whole of Ca atoms from the above amorphous manganese oxide represented by the general formula $CaMn_2O_4$ $nH_2O$ ($0 \leq n \leq 20$).

The removal of the calcium atoms in the amorphous manganese oxide of $CaMn_2O_4 \cdot nH_2O$ ($0 \leq n \leq 20$) is conducted by oxidation treatment for oxidizing Mn to +4 valence in the same manner as in synthesis of manganese oxide represented by $Zn_xMn_2O_4$ ($0 < x < 1$) having spinal crystal structure. The removal of a part or the whole of Ca atoms changes the amorphous crystal structure into a δ type structure having an undeveloped layer structure having vacant sites for cation between the layers, although the reason therefor is not known. Generally, the δ type structure is a layer structure having cation between layers. Removal of a part or the whole of the calcium is considered to form the vacant sites for cation between the layers.

Conventionally, the removal of cation is carried out by mineral acid treatment. In the acid treatment, a high concentration of the mineral acid is required to remove Ca sufficiently, and the use of the high concentration of mineral acid accelerate disproportionation reaction of Mn atoms to cause crystal structure change from δ type to γ type, so that the δ type crystal structure is not maintained in desired removal of Ca by acid treatment. Furthermore, the acid treatment gives layered manganese oxide of a proton type formed by replacing cation between the layers with proton, therefore the product being not used as a host compound, and being limited in its uses.

The oxide, in the present invention, represented by the general formula $CoMn_2O_4$ in which the Co:Mn molar ratio is 1:2 has a layer-and-spinel type crystal structure that has not ever been identified. The only one known double oxide containing Co and Mn is a manganese oxide having a composition of $CoMn_2O_4$ and having a spinel type crystal structure. On the contrary, the manganese oxide of the present invention is not only of a simple spinel type crystal structure, but also is of a compounded crystal structure with a layer structure having various interplanar spacing of 7.25 angstrom, etc. like sodium birnessite.

In order to obtain the manganese oxide having Co:Mn molar ratio of 1:2 of a layer-and-spinel crystal structure, the important point is that a mixture of cobalt hydroxide and manganese hydroxide in a molar ratio of 1:2 is oxidized in an aqueous alkali solution. By oxidizing the hydroxide mixture in an aqueous alkali solution, the double oxide of a Co:Mn molar ratio of 1:2 having a layer-and-spinel structure is synthesizable although the detailed mechanism is not known.

The oxidation is conducted by aeration in the same manner as in synthesis of the aforementioned manganese oxide of the layer structure of the general formula of $MgMn_2O_4 \cdot nH_2O$ ($0 \leq n \leq 20$). The hydroxide is oxidized by bubbling air and/or oxygen into the solution, giving manganese oxide in a layer-and-spinel structure combined with Co.

The manganese oxide represented by the general formula $Co_xMn_2O_4$ ($0 \leq x < 1$) having a layer-and-spinel structure of the present invention is derived by removing a part or the whole of the Co atoms from the above manganese oxide represented by the general formula $CoMn_2O_4$ having a layer-and-spinel type crystal structure, and has a crystal structure in which cation transfer paths and cation receiving sites in three-dimensional tunnel formed by two-dimensional layers formed by electrostatic repulsion of oxygen atoms and closest packing of oxygen atoms.

The oxide having such a crystal structure exhibits the characteristic function as described below. Generally, when cation is inserted into a layer structure like the layer crystal structure, the electrostatic repulsion of oxygen is suppressed by the charge of the cation to reduce the interlayer distance, whereas when the cation is released, the electrostatic repulsion of oxygen increases to cause expansion of the interlayer distance. On the contrary, when cation is inserted into a three-dimensional tunnel like in the spinel type structure the bond distance of the close-packed oxygen is expanded by the volume of the cation, and restores the bond distance of the original close-packed oxygen by release of the cation.

In such a manner, the expansion and shrink of the crystal structure by insertion and release of the cation is just opposite between the layer structure and the spinel structure. Accordingly, the manganese oxide having both crystal structures of a layer type and a spinel type represented by $Co_xMn_2O_4$ ($0 \leq x < 1$) of the present invention exhibits extremely small expansion-shrink of crystal on insertion and release of cation. Therefore this manganese oxide when used as a host compound, is considered to function reversibly and stably.

The removal of Co from $CoMn_2O_4$ is achievable in the same manner as in synthesis of a manganese oxide represented by the general formula $Zn_xMn_2O_4$ ($0 < x < 1$) having a spinel type crystal structure by an oxidation treatment to oxidize Mn to +4 valence.

A lithium secondary battery exhibiting high output, high energy density, and satisfactory reversibility of charge-discharge cycles is provided by use, as the positive electrode of the battery, of some kind of the manganese oxide represented by the general formula $A_xMn_2O_4 \cdot nH_2O$ (where A is Zn, Mg, Ca, or Co; and if A is Zn, $0<X<1$ and n=0; if A is Mg or Ca, $0 \leq x \leq 1$ and $0 \leq n \leq 20$; and if A is Co, $0<x \leq 1$ and n=0), The negative electrode of the lithium secondary battery of the present invention is made of lithium and/or a substance capable of receiving and releasing lithium, such as lithium metal, lithium-aluminum alloy, lithium-tin alloy, lithium-lead alloy, and carbonaceous materials capable of doping and releasing lithium ion electrochemically.

The electrolyte employed in the lithium secondary battery of the present invention is not specially limited, and includes lithium salt solutions in an organic solvent such as carbonates, sulfolanes, lactones, and ethers, and lithium ion-conductive solid electrolytes.

FIG. 1 illustrates a three-electrode cell construction which employs, as the positive electrode, a manganese oxide represented by the general formula $A_xMn_2O_4 \cdot nH_2O$ (where A is Zn, Mg, Ca, or Co; and if A is Zn, $0<X<1$ and n=0; if A is Mg or Ca, $0 \leq x \leq 1$ and $0 \leq n \leq 20$; and if A is Co, $0<x \leq 1$ and n=0).

The present invention is described in more detail by reference to examples without limiting the invention in any way.

In Examples and Comparative Examples, X-ray diffraction pattern was measured under the conditions below:

Apparatus: Philips Pw-1729
X-ray: Cu-Kα line
Measurement mode: Step-scan
Scanning: 0.02° per second (as 2 θ)
Time of measurement: 3 seconds
Measured range: 5° to 70° (as 2 θ)

In Examples and Comparative Examples, the surface area was measured by Creating the sample in nitrogen gas stream (flow rate 15 ml per min.) at 250° C. for 40 minutes, and then was subjected to measurement with the automatic surface area measurement apparatus (ASA-2000, made by Shibata Kagaku Kiki Kogyo)

EXAMPLE 1

Manganese oxide of a spinal type crystal structure represented by the general formula $Zn_xMn_2O_4$ ($0<x<1$) was prepared by the procedures below.

(Preparation of $ZnMn_2O$)

Figure 2:
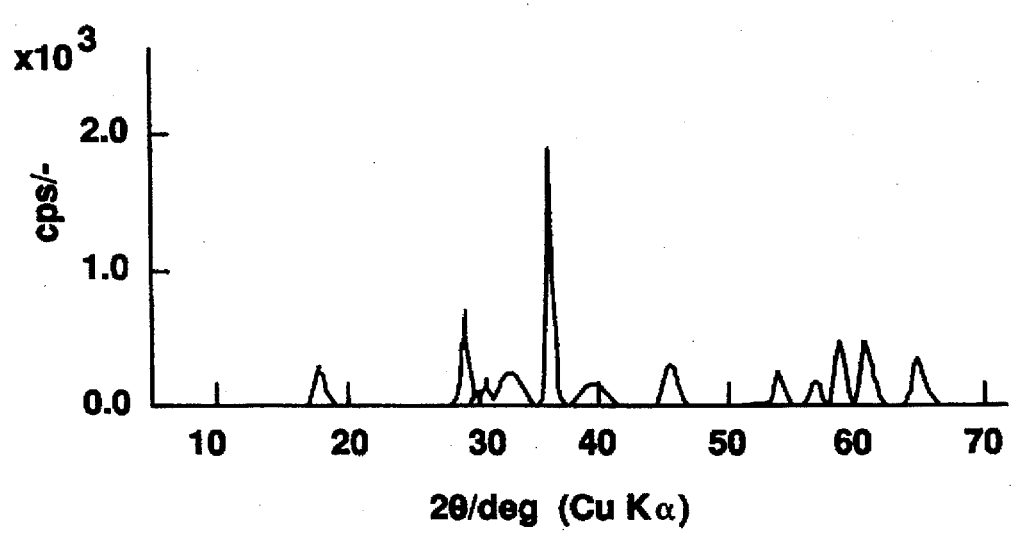
FIG. 2 is an X-ray diffraction pattern of $ZnMn_2O_4$ prepared in Example 1.

Into an aqueous solution containing 0.52 mol/dm³ of manganese sulfate and 0.26 mol/dm³ of zinc sulfate, nitrogen gas was bubbled sufficiently. Then to 1 liter of the solution, 2 liters of 2.67 mol/dm³ of sodium hydroxide solution was added at a rate of 10 ml/min. Then, to the solution, air was bubbled at a rate of 25 ml/min for three days. The resulting precipitate was washed with water, collected by filtration and dried at 70° C. for 24 hours. The resulting compound was found to be $ZnMn_2O_4$ from X-ray diffraction. FIG. 2 shows the X-ray diffraction pattern. The BET specific surface area was found to be 42 m²/g.

(Removal of Zn-preparation of $Zn_xMn_2O_4$)

Figure 3:
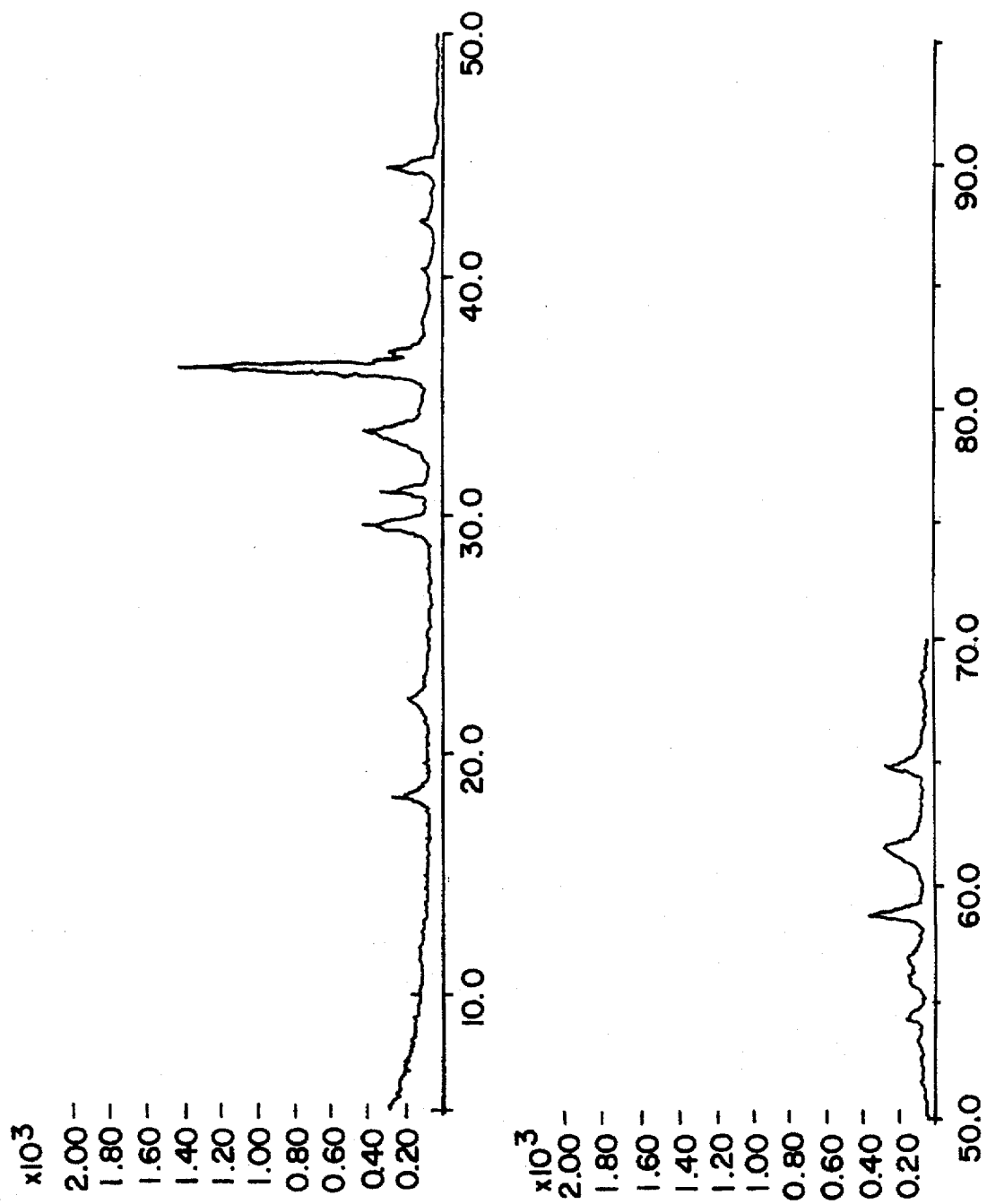
FIG. 3 is am X-ray diffraction pattern of $Zn_{0.67}Mn_2O_4$ prepared in Example 1.

5 Grams of the powdery $ZnMn_2O_4$ obtained above was added to 250 ml of aqueous 0.042 mol/dm³ ammonium persulfate solution, and the mixture was stirred at 70° C. for 4 hours. The product was washed with water, collected by filtration, and dried at 70° C. for 24 hours. The resulting compound was found to be $Zn_{0.67}Mn_2O_4$ of a spinel type crystal structure from X-ray diffraction and composition analysis. The X-ray diffraction pattern is shown in FIG. 3, and the composition analysis result shown in Table 1.

(Construction of Electric Cell)

The obtained manganese oxide having a spinel type crystalline structure, powdery carbon as the electroconductive material, and powdery polytetrafluoroethylene as a binder were mixed in a ratio of 88:7:5 by weight. 75 mg of this mixture was molded into a pellet of 8 mm in diameter by applying a pressure of 2 ton/cm². This pellet was dried at 250° C. for 2 hours. A three-electrode cell shown in FIG. 1 was constructed by using the pellet as the test electrode 2, a lithium foil as the counter electrode 4, a lithium piece cut out from the lithium foil as the reference electrode, and 1 mol/dm³ lithium perchlorate solution in propylene carbonate as the electrolyte.

The three-electrode cell constructed as above was employed in cyclic voltammetry conducted at a potential scanning rate of 5 mV/sec and an electrode potential range of from 0.75 V to 5.0 V relative to the reference electrode by repeating oxidation-reduction. Table 2 shows the reduction capacity (equivalent to discharge capacity), the peak current value, and average output derived from the tenth cycle of the cyclic voltammetry.

EXAMPLE 2

Figure 4:
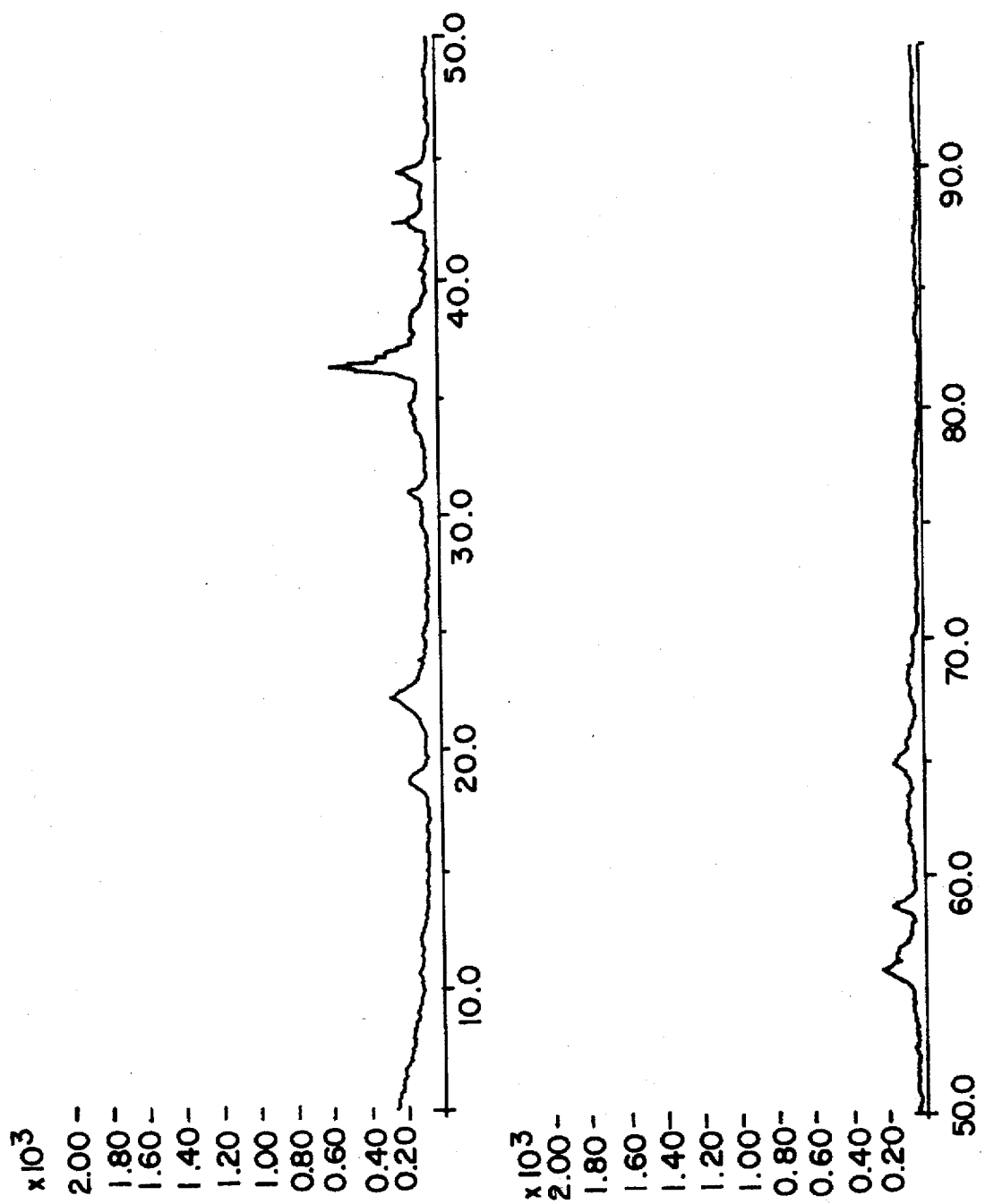
FIG. 4 is an X-ray diffraction pattern of $Zn_{0.33}Mn_2O_4$ prepared in Example 2.

$Zn_xMn_2O_4$ was prepared in the same manner as in Example 1 except that 0.084 mol/dm³ ammonium persulfate solution was used in the oxidation treatment. The resulting compound was found to be $Zn_{0.33}Mn_2O_4$ of a spinel type crystal structure from X-ray diffraction and composition analysis. The X-ray diffraction pattern is shown in FIG. 4, and the composition analysis result is shown in Table 1.

A three-electrode cell was constructed in the same manner as in Example 1 except for using the above manganese oxide as the test electrode, and the cyclic voltammetry was conducted in the same manner as in Example 1. The results are shown in Table 2.

EXAMPLE 3

Figure 5:
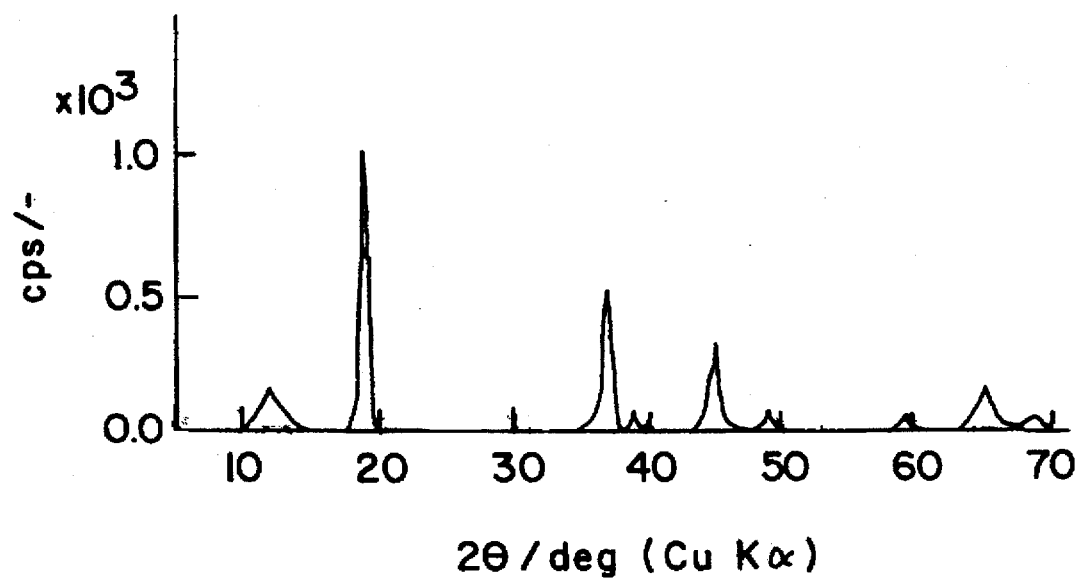
FIG. 5 is an X-ray diffraction pattern of $Zn_{0.1}Mn_2O_4$ prepared in Example 3.

$Zn_xMn_2O_4$ was prepared in the same manner as in Example 1 except that 0.5 mol/dm³ ammonium persulfate solution was used in the oxidation treatment. The resulting compound was found to be $Zn_{0.10}Mn_2O_4$ of a spinel type crystal structure from X-ray diffraction and composition analysis. The x-ray diffraction pattern is shown in FIG. 5, and the composition analysis result is shown in Table 1.

A three-electrode cell was constructed in the same manner as in Example 1 except for using the above manganese oxide as the test electrode, and the cyclic voltammetry was conducted in the same manner as in Example 1. The results are shown in Table 2.

EXAMPLE 4

Figure 6:
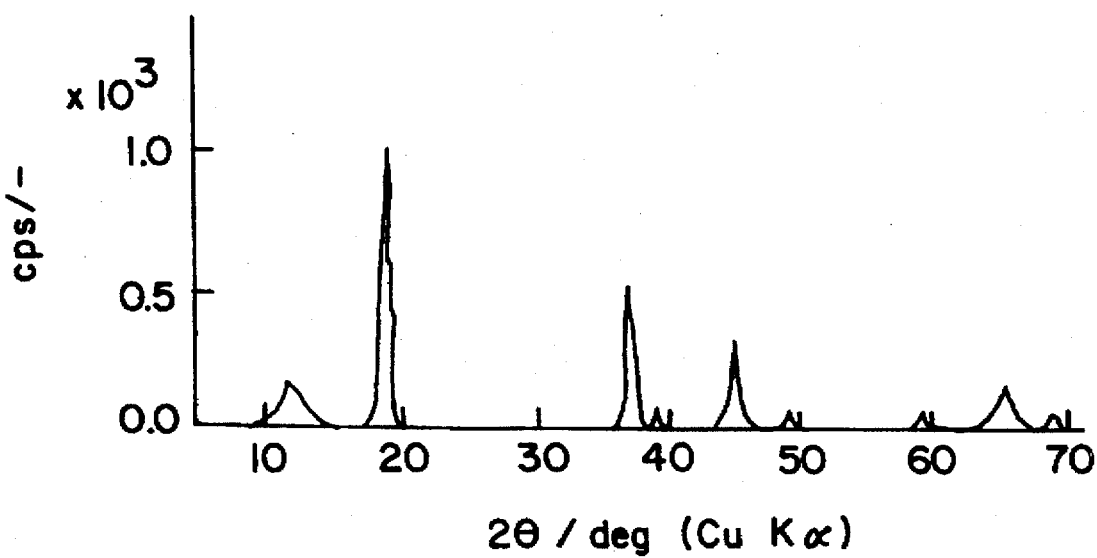
FIG. 6 is an X-ray diffraction pattern of manganese dioxide of spinal type crystal structure prepared in Example 4.

The same treatment was conducted in the same manner as in Example 1 except that 1.0 mol/dm³ ammonium persulfate was used in the oxidation treatment. The resulting compound was found to be manganese dioxide of spinal type crystal structure from X-ray diffraction and composition analysis. The X-ray diffraction pattern is shown in FIG. 6, and the composition analysis result is shown in Table 1. The BET surface area was 152 m²/g.

A three-electrode cell was constructed in the same manner as in Example 1 except for using the above manganese oxide as the test electrode, and the cyclic voltammetry was conducted in the same manner as in Example 1. The results are shown in Table 2.

EXAMPLE 5

Figure 7:
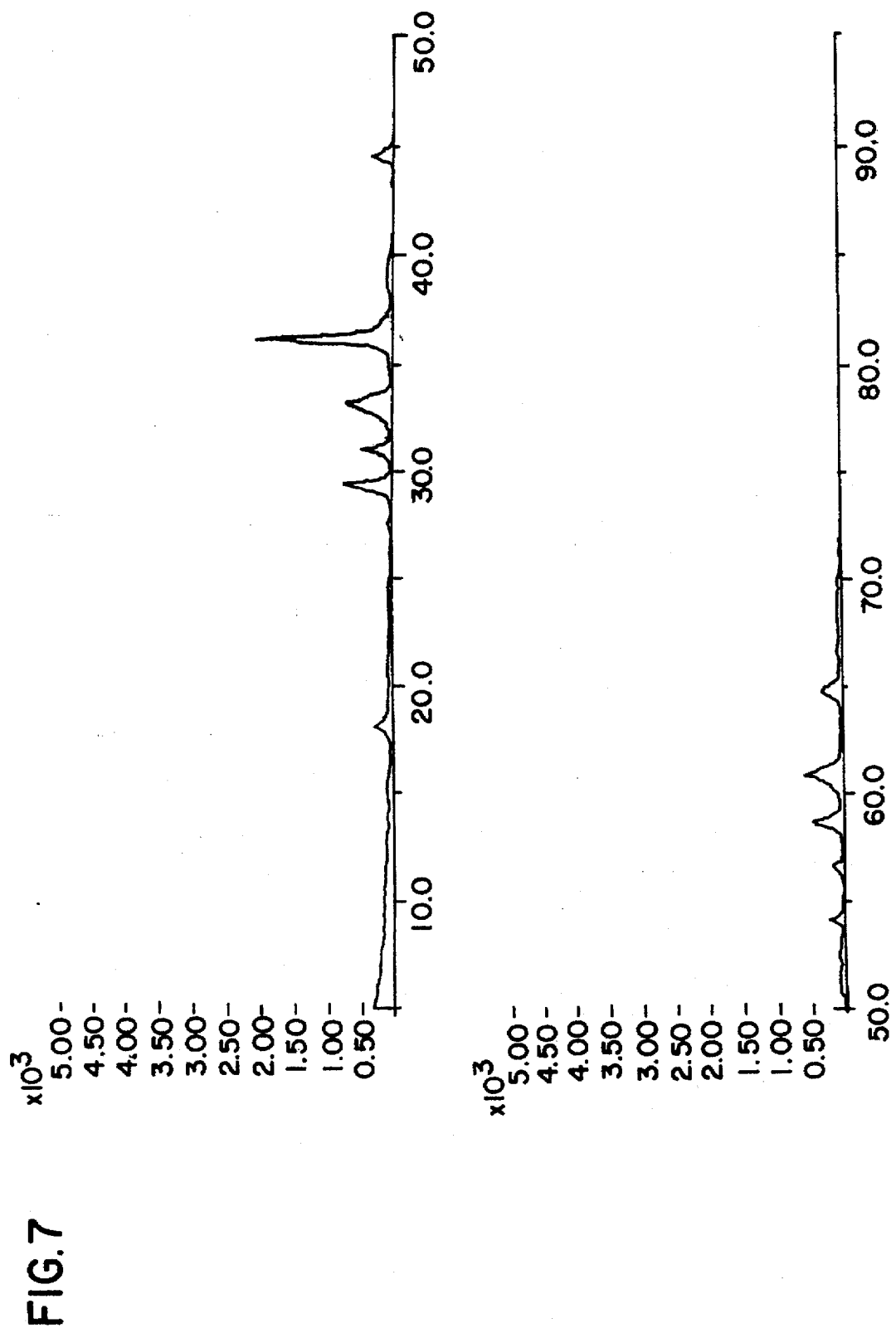
FIG. 7 is an X-ray diffraction pattern of $ZnMn_2O_4$ prepared in Example 5.

$ZnMn_2O_4$ was prepared in the same manner as in Example 1 except for using an aqueous solution containing 0.52 mol/dm³ manganese nitrate and 0.26 mol/dm³ zinc nitrate. The resulting compound was found to be $ZnMn_2O_4$ by X-ray diffraction. FIG. 7 shows the X-ray diffraction pattern. The BET specific surface area was 12 m²/g.

Figure 8:
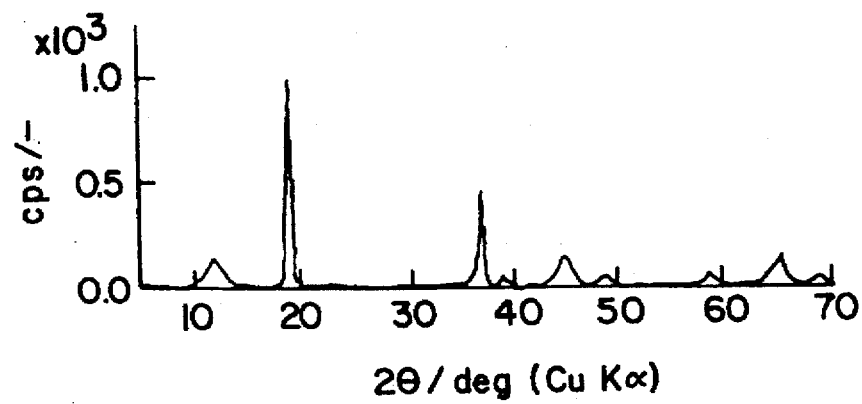
FIG. 8 is an X-ray diffraction pattern of $Zn_{0.10}Mn_2O_4$ prepared in Example 5.

Then the oxidation treatment was conducted in the same manner as in Example 1 except for using aqueous 0.5 mol/dm³ ammonium persulfate solution. The resulting compound was found to be $Zn_{0.10}Mn_2O_4$ of a spinel type crystal structure from X-ray diffraction and composition analysis. The X-ray diffraction pattern, is shown in FIG. 8, and the composition analysis result is shown in Table 1.

A three-electrode cell was constructed in the same manner as in Example 1 except for using the above manganese oxide as the test electrode, and the cyclic voltammetry was conducted in the same manner as in Example 1. The results are shown in Table 2.

EXAMPLE 6

Figure 9:
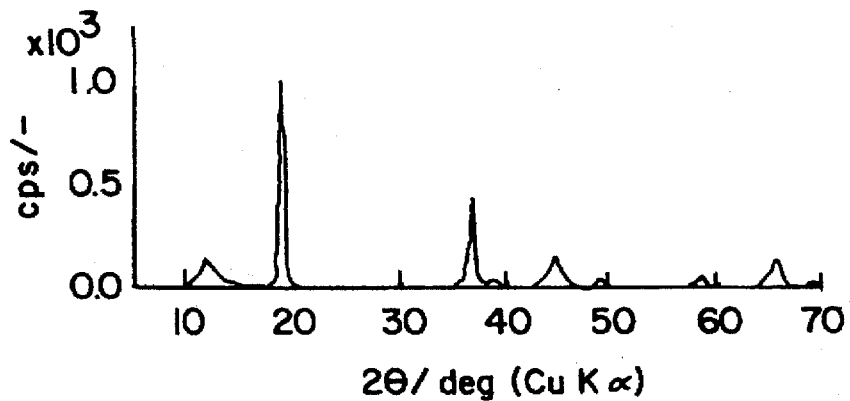
FIG. 9 is an X-ray diffraction pattern of manganese dioxide of spinal type crystal structure prepared in Example 6.

The same treatment was conducted in the same manner as in Example 5 except that 1.0 mol/dm³ ammonium persulfate was used in the oxidation treatment. The resulting compound was found to be manganese dioxide of a spinel type crystal structure from X-ray diffraction and composition analysis. The X-ray diffraction pattern is shown in FIG. 9, and the composition analysis result is shown in Table 1. The BET surface area was 113 m²/g.

A three-electrode cell was constructed in the same manner as in Example 1 except for using the above manganese oxide as the test electrode, and the cyclic voltammetry was conducted in the same manner as in Example 1. The results are shown in Table 2.

COMPARATIVE EXAMPLE 1

Figure 10:
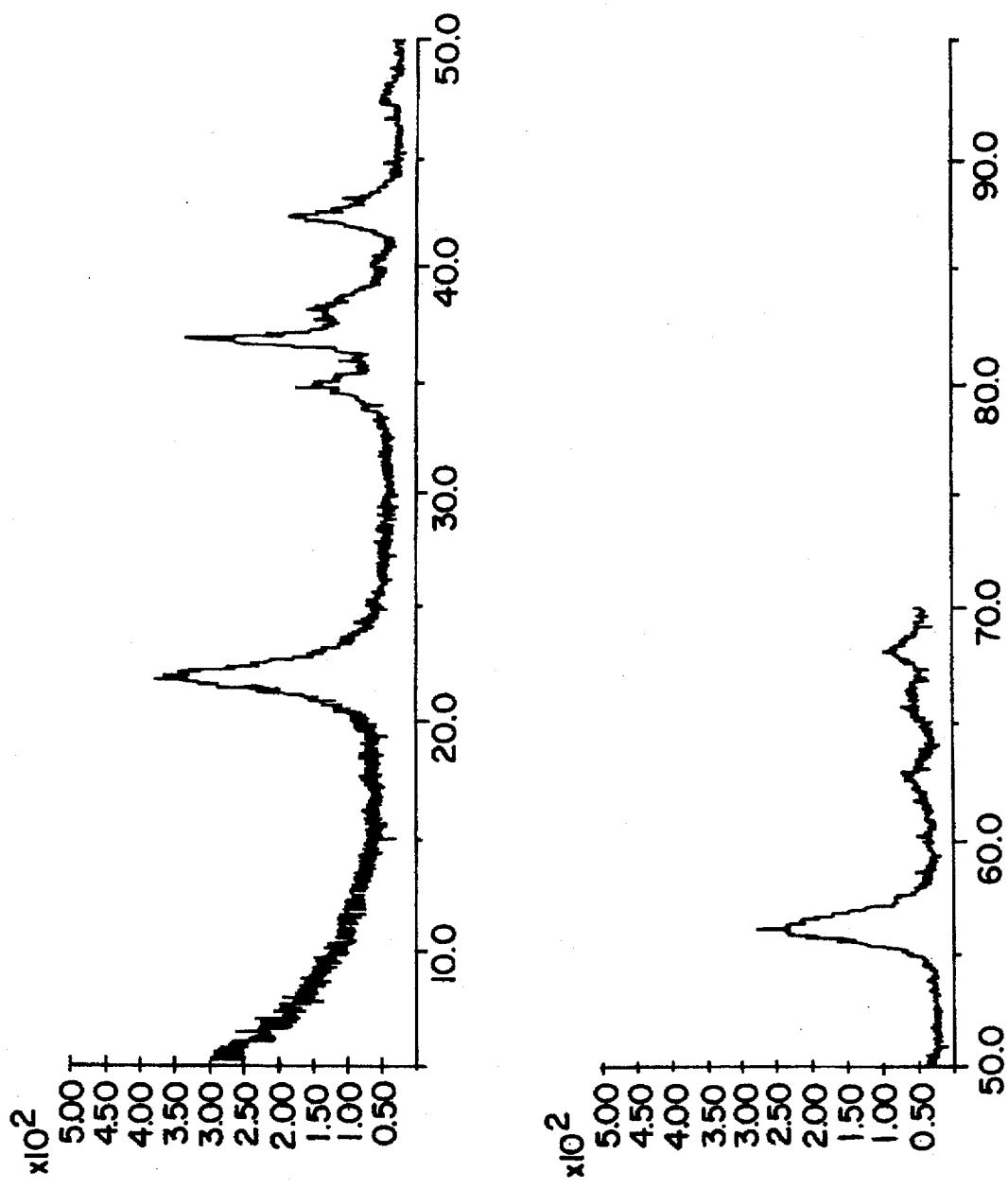
FIG. 10 is an X-ray diffraction pattern of manganese oxide having γ type crystal structure prepared in Comparative Example 1.

The treatment was conducted in the same manner as in Example 1 except that 250 ml of aqueous 0.1 mol/dm³ sulfuric acid solution was used in the oxidation treatment. The resulting compound was found to be manganese oxide of a γ type crystal structure from X-ray diffraction. The X-ray diffraction pattern is shown in FIG. 10. The result of the composition analysis is shown in Table 1.

COMPARATIVE EXAMPLE 2

Figure 11:
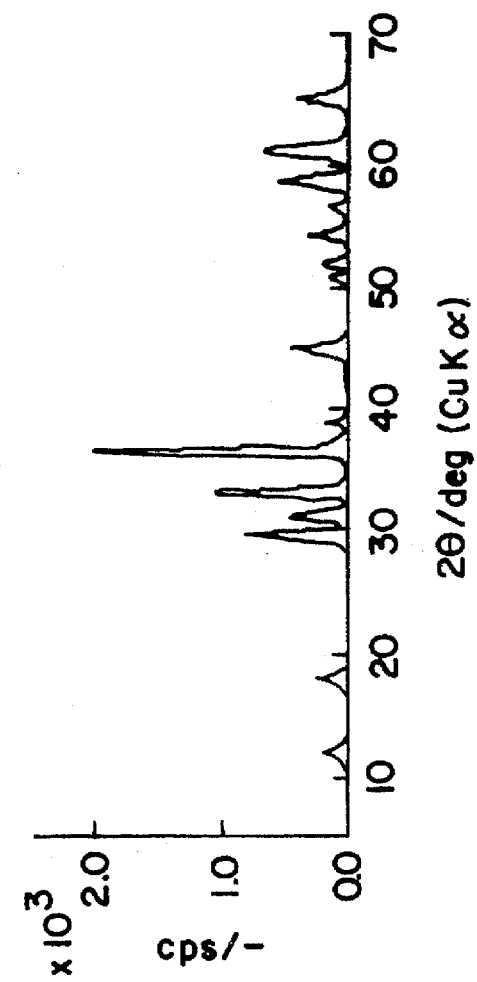
FIG. 11 is an X-ray diffraction pattern of $ZnMn_2O_4$ prepared in Comparative Example 2.

$ZnMn_2O_4$ was prepared as follows. 15.8 Grams of powdery dimanganese trioxide ($Mn_2O_3$) and 8.1 g of powdery zinc oxide (ZnO) was mixed enough with an agate mortar. The powdery mixture was heated at 850° C. for 20 hours by means of an open-air type electric furnace. The resulting compound was found to be $ZnMn_2O_4$ by X-ray diffraction and composition analysis. FIG. 11 shows the X-ray diffraction pattern, and Table 1 shows the result of the composition analysis. The BET specific surface area was 1 m²/g.

Figure 12:
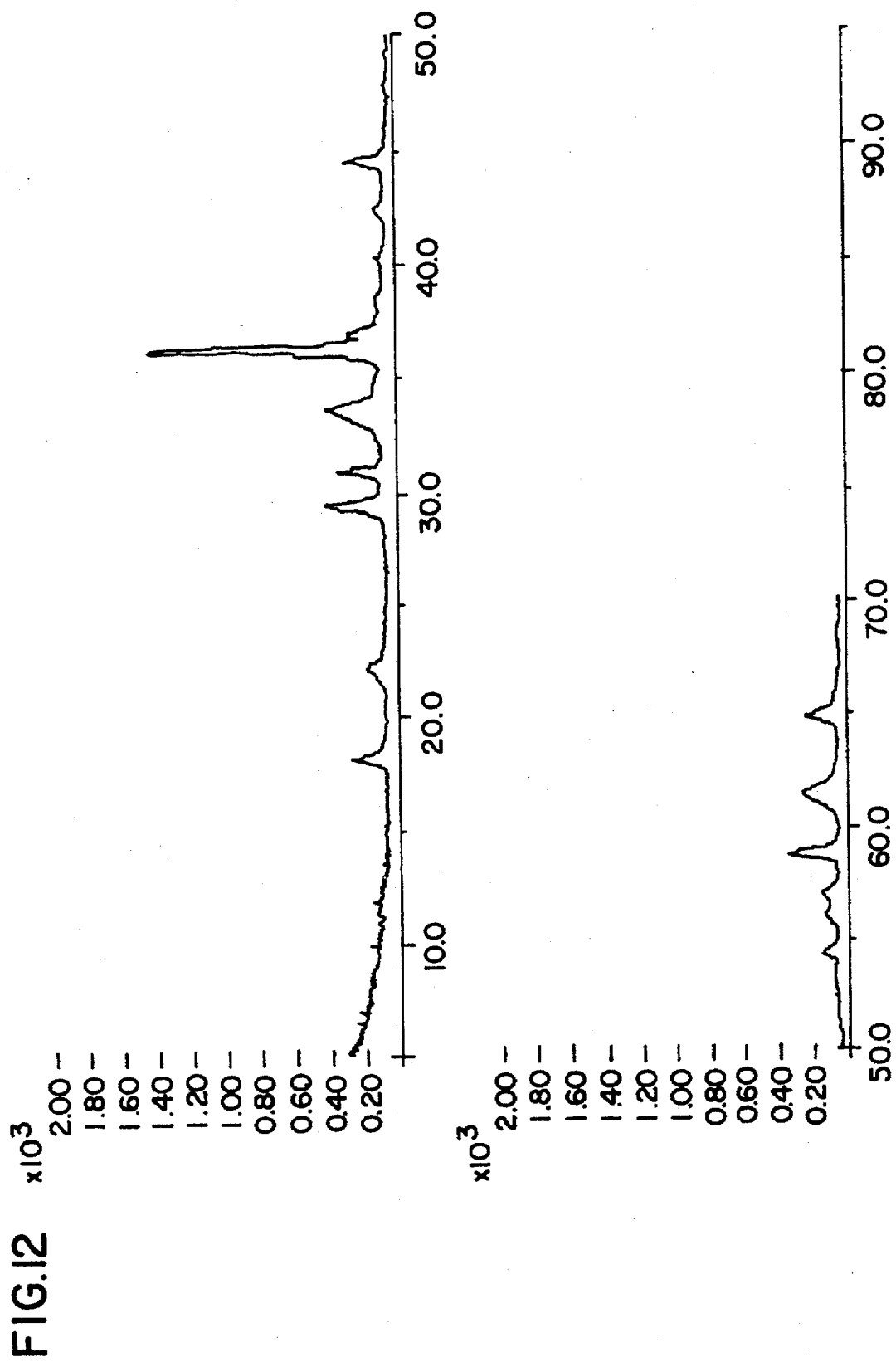
FIG. 12 is an X-ray diffraction pattern of $Zn_{0.9}Mn_2O_4$ prepared in Comparative Example 2.

Then the above compound was subjected to oxidation treatment in the same manner as in Example 4 to obtain $Zn_xMn_2O_4$. The resulting compound was found to be $Zn_{0.9}Mn_2O_4$ of a spinel type crystal structure. FIG. 12 shows the X-ray diffraction pattern, and Table 1 shows the result of the composition analysis. The BET specific surface area was 27 m²/g.

A three-pole electrode was constructed in the same manner as in Example 1 except for using the above manganese oxide as the test electrode, and the cyclic voltammetry was conducted in the same manner as in Example 1. The results are shown in Table 2.

COMPARATIVE EXAMPLE 3

As a manganese oxide having a spinel type crystal structure, $LiMn_2O_4$ was prepared as follows. 15.8 Grams of powdery dimanganese trioxide ($Mn_2O_3$) and 1.5 g of powdery lithium oxide ($Li_2O$) was mixed enough with an agate mortar. The powdery mixture was heated at 850° C. for 20 hours by means of an open-air type electric furnace. The resulting compound was found to be $LiMn_2O_4$ (lithium manganese spinel) by X-ray diffraction and composition analysis.

A three-electrode cell was constructed in the same manner as in Example 1 except for using the above $LiMn_2O_4$ as the test electrode 2, and the cyclic voltammetry was conducted in the same manner as in Example 1. The results are shown in Table 2.

EXAMPLE 7

A manganese oxide represented by the general formula $Mg_xMn_2O_4 \cdot nH_2O$ ($0 \leq x \leq 1$, $0 \leq n \leq 20$) was synthesized as follows.

(Preparation of $Mg_xMn_2O_4 \cdot nH_2O$ ($0 \leq n \leq 20$))

Into an aqueous solution containing 0.52 mol/dm³ of manganese sulfate and 0.26 mol/dm³ of magnesium sulfate, nitrogen gas was bubbled sufficiently. Then, to 1 liter of the solution, 2 liters of 2.67 mol/dm³ sodium hydroxide solution was added at a rate of 10 ml/min to obtain an aqueous alkali solution of containing magnesium hydroxide and manganese hydroxide (molar ratio=1:2). Then, to the solution, air was bubbled at a rate of 25 ml/min for three days. The resulting precipitate was washed with water, collected by filtration, and dried at 70° C. for 24 hours.

The resulting compound was found, by composition analysis, to be a manganese oxide containing Mg and Mn in a molar ratio of 1:2, having an oxidation degree of Mn of $x=1.79$ in terms of $MnO_x$, and represented by the formula $MgMn_2O_4 \cdot 16H_2O$.

Figure 13:
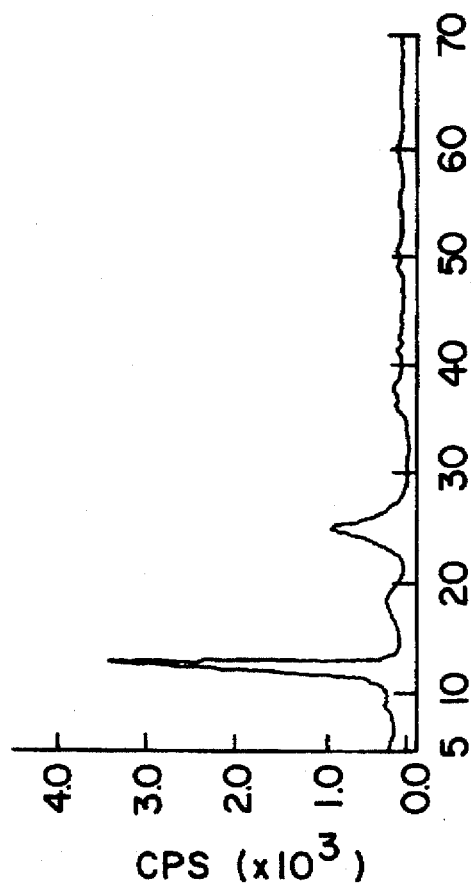
FIG. 13 is an X-ray diffraction pattern of $MgMn_2O_4.16H_2O$ prepared in Example 7.

According to X-ray diffraction measurement (X-ray source: Cu-α line), this compound was found to be a manganese oxide of a layer structure having various interplanar spacings of 2.48, 2.51, 3.56, 5.00, 7.14 and 9.23 angstrom. FIG. 13 shows the X-ray diffraction pattern of this manganese oxide. Table 3 shows the X-ray diffraction pattern data of this compound. For comparison, X-ray diffraction pattern data of $MgMn_2O_4$ described in ASTM card is Shown also in Table 3.

From Table 3, the manganese oxide obtained by the present invention is a novel substance which is completely different from the known spinel type $MgMn_2O_4$.

(Removal of Mg-Preparation of $Mg_xMn_2O_4 \cdot nH_2O$ ($0 \leq x < 1$, $0 \leq n \leq 20$))

Figure 14:
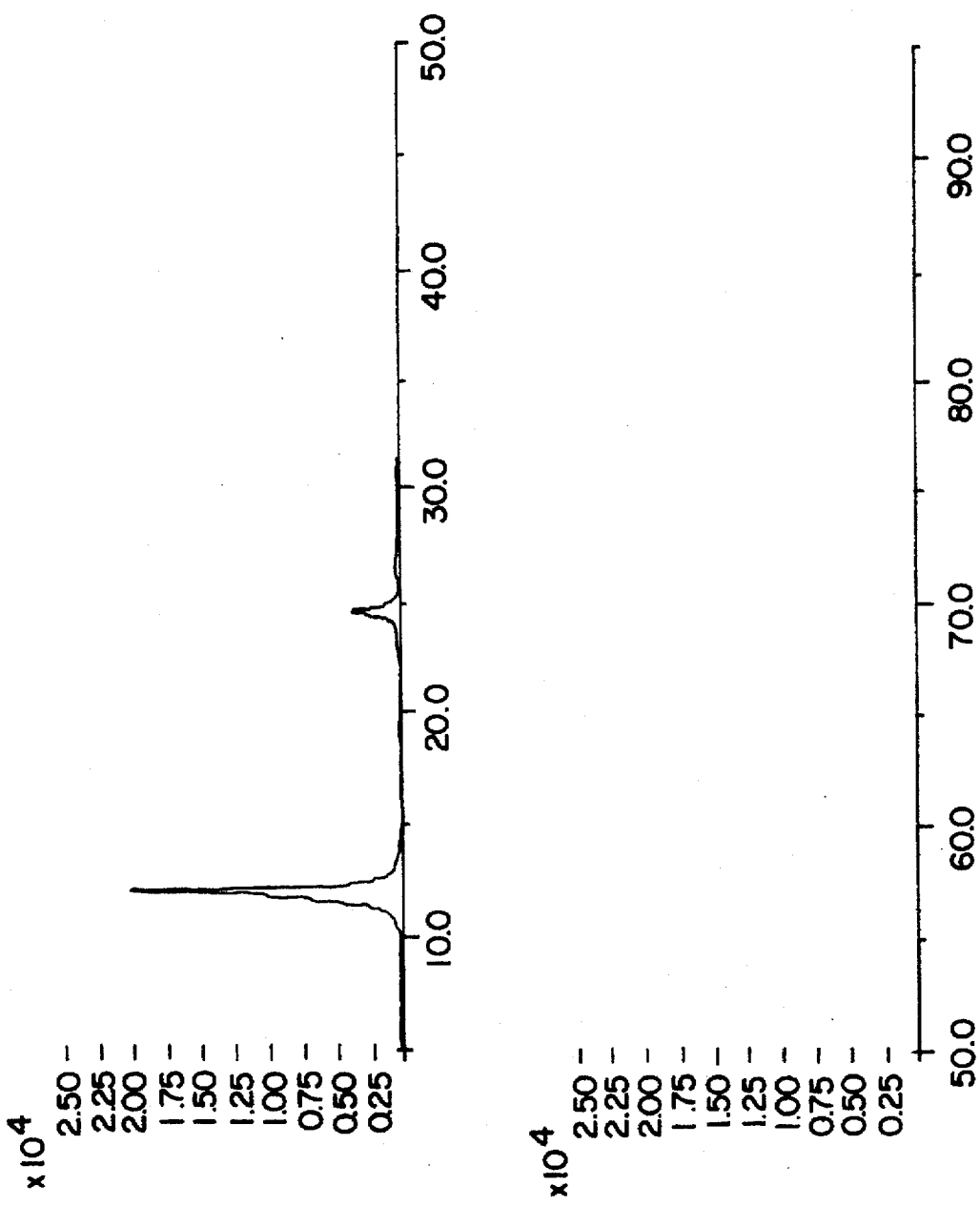
FIG. 14 is an X-ray diffraction pattern of $Mg_{0.08}Mn_2O_4.H_2O$ prepared in Example 8.

5 Grams of the powdery $MgMn_2O_4 \cdot 16H_2O$ obtained above was added to 250 ml of aqueous 0.5 mol/dm³ ammonium persulfate solution, and the mixture was stirred at 70° C. for 4 hours. The product was washed with water, collected by filtration, and dried at 70° C. for 24 hours. The resulting compound was found to be $Mg_{0.08}Mn_2O_4 \cdot H_2O$ from composition analysis, and to have an oxidation degree of =1.95 in terms of $MnO_x$ by valence measurement of Mn. Further, this compound was found to have a layer type crystal structure maintaining the crystal structure of the starting material $MgMn_2O_4 \cdot 16H_2O$ by X-ray diffraction measurement. The X-ray diffraction pattern is shown in FIG. 14.

(Construction of Electric Cell)

A three-pole cell was constructed in the same manner as in Example 1 except for using the above $Mg_{0.08}Mn_2O_4 \cdot H_2O$ as the test electrode 2, and the cyclic voltammetry was conducted in the same manner as in Example 1. Table 4 shows the reduction capacity (equivalent to discharge capacity), the peak current value, and average output derived from the tenth cycle of the cyclic voltammetry.

EXAMPLE 8

A manganese oxide was synthesized in the same manner as in Example 7 except that 0.52 mol/dm³ manganese nitrate solution and 0.26 mol/dm³ magnesium nitrate solution were used and oxygen was bubbled in place of air.

The resulting compound was found, by composition analysis, to be a manganese oxide containing Mg and Mn in a molar ratio of 1:2, having an oxidation degree of Mn of $x=1.79$ in terms of MnO and represented by the formula $MgMn_2O_4 \cdot 14H_2O$.

Figure 15:
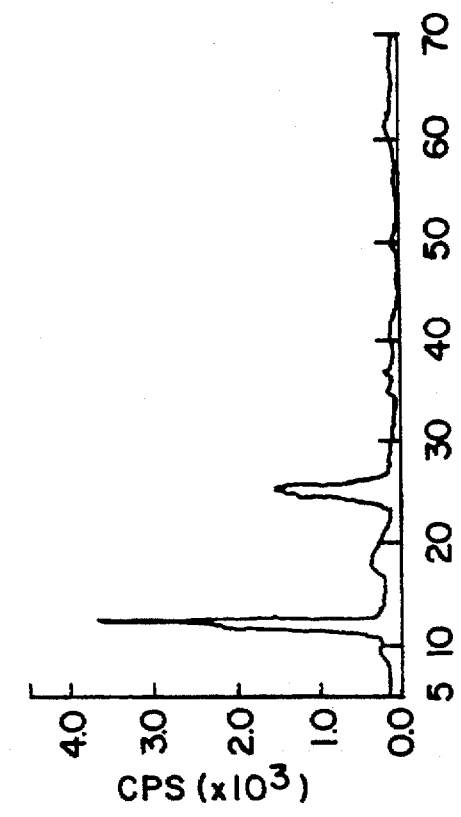
FIG. 15 is an X-ray diffraction pattern of $MgMn_2O_4.14H_2O$ prepared in Example 8.

According to X-ray diffraction measurement X-ray source: Cu-Kα line), this compound was found to be a manganese oxide of a layer structure having various interplanar spacings of 2.48, 2.51, 3.56, 5.00, 7.14 and 9.23 angstrom. FIG. 15 shows the X-ray diffraction pattern of this manganese oxide. Table 3 shows the X-ray diffraction pattern data of this compound. From Table 3, the manganese oxide obtained by the present invention is a novel substance which is completely different from the known spinel type $MgMn_2O_4$.

Figure 16:
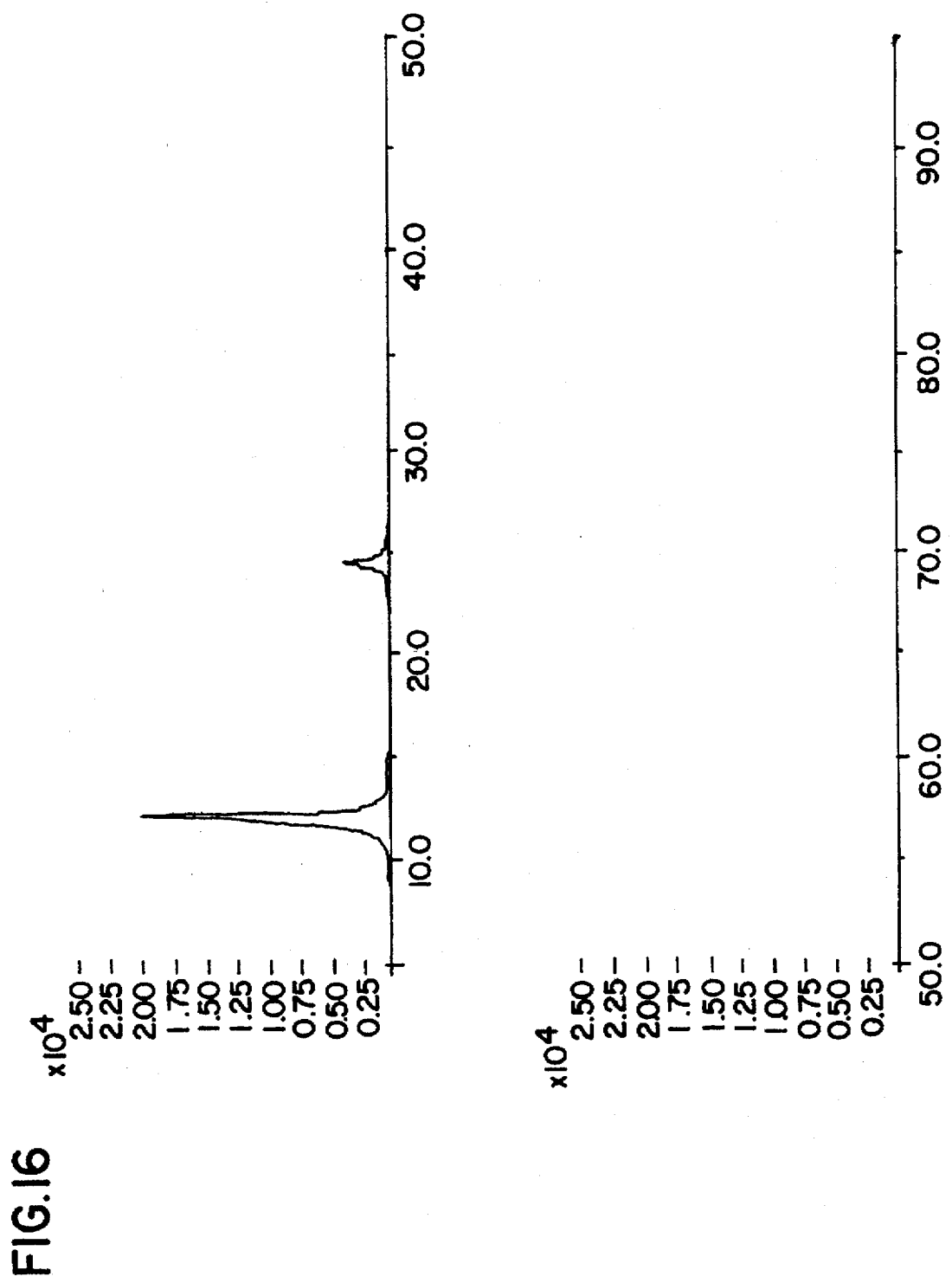
FIG. 16 is an X-ray diffraction pattern of $Mg_{0.06}Mn_2O_4.16H_2O$ prepared in Example 8.

Then 5 g of powdery $MgMn_2O_4 \cdot 14H_2O$ obtained above was further treated in the same manner as in Example 7 in order to remove Mg. The compound obtained by this treatment was a manganese oxide represented by composition formula, $Mg_{0.06}Mn_2O_4 \cdot 0.8H_2O$, having an oxidation degree of Mn of $x=1.95$ in terms of $MnO_x$. The X-ray diffraction pattern thereof is shown in FIG. 16.

A three-electrode cell was constructed in the same manner as in Example 1 except for using the above $Mg_{0.06}Mn_2O_4 \cdot 0.8H_2O$ having a layer structure as the test electrode 2, and the cyclic voltammetry was conducted in the same manner as in Example 1. Table 4 shows the results.

COMPARATIVE EXAMPLE 4

Sodium birnessite having a layer structure was synthesized as follows. An aqueous 0.52 mol/dm³ manganese nitrate solution was cooled to 0° C. and gaseous nitrogen was bubbled therein sufficiently. To 1 liter of this solution in a cooled state, 2 liters of 2.67 mol/dm³ sodium hydroxide solution was added at a rate of 10 ml/min, and then air was bubbled therein at a rate of 25 ml/min for three days. The formed precipitate was washed with water and collected by filtration, and dried at 70° C. for 24 hours.

Figure 17:
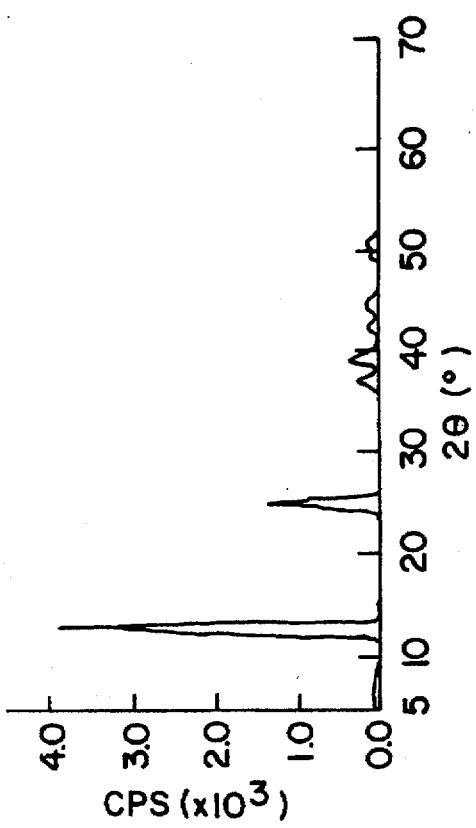
FIG. 17 is an X-ray diffraction pattern of sodium birnessite prepared in comparative Example 4.

From composition analysis and X-ray diffraction measurement, the resulting compound was confirmed to be synthetic sodium birnessite ($Na_4Mn_{14}O_{27} \cdot 9H_2O$) having a layer structure. FIG. 17 shows the X-ray diffraction pattern of the obtained compound.

Figure 18:
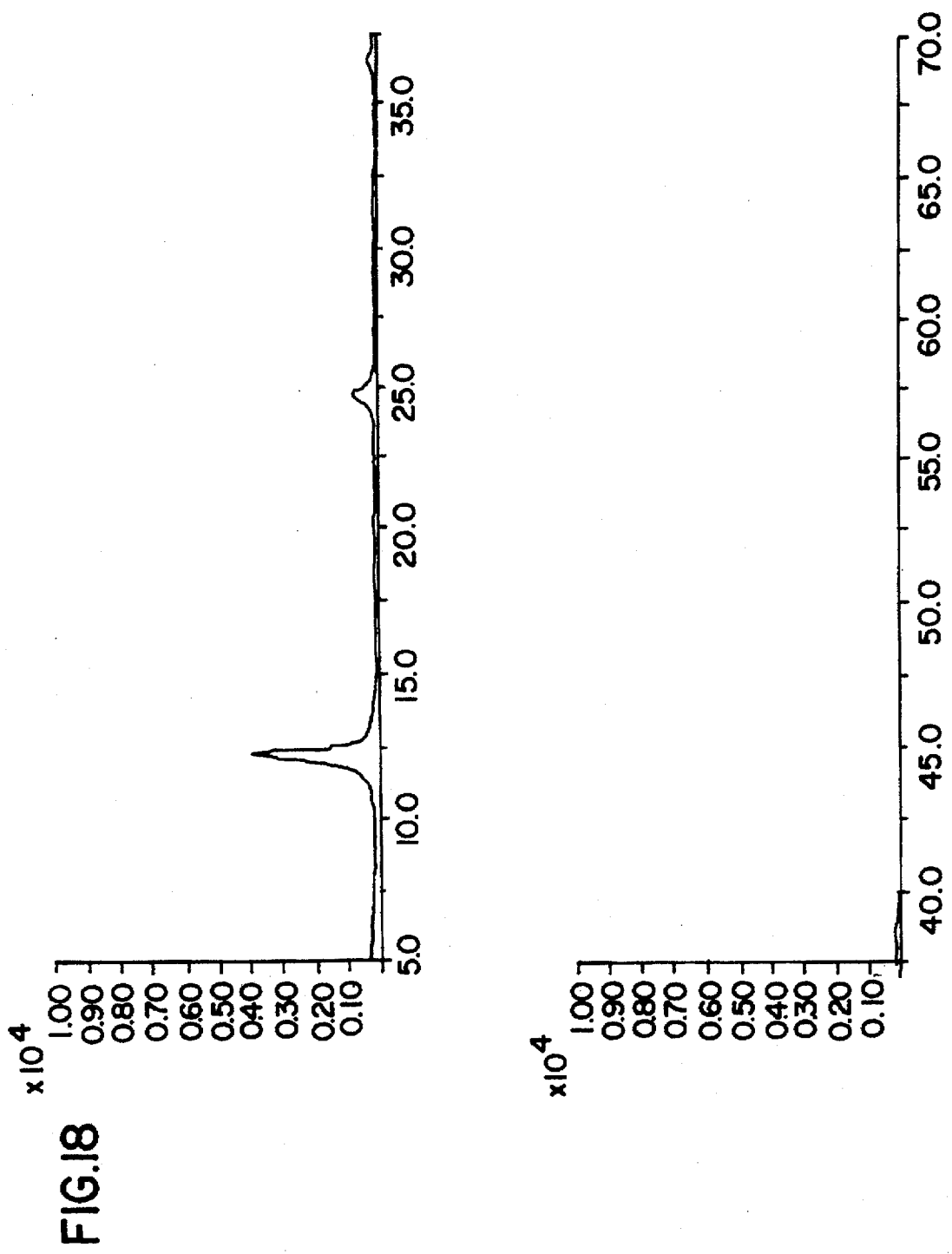
FIG. 18 is an X-ray diffraction pattern of sodium-free birnessite prepared in Comparative Example 4.

Then 5 g of powdery this compound was added into 2 liters of an aqueous nitric acid solution of pH 2, and the mixture was stirred at 70° C. for 16 hours. The product was washed with water, collected by filtration, and dried at 70° C. for 24 hours. From composition analysis and X-ray diffraction measurement, the obtained compound was confirmed to be a sodium-free birnessite ($Mn_7O_{13} \cdot 5H_2O$) having a layer structure. FIG. 18 shows the X-ray diffraction pattern thereof.

A three-electrode cell was constructed in the same manner as in Example 1 except for using the above $Mn_7O_{13} \cdot 5H_2O$ having a layer structure as the test electrode 2, and the cyclic voltammetry was conducted in the same manner as in Example 1. Table 4 shows the results.

EXAMPLE 9

A manganese oxide represented by the general formula $Ca_xMn_2O_4 \cdot nH_2O$ ($0 \leq x \leq 1$, $0 \leq n \leq 20$) as follows.

(Preparation of $CaMn_2O_4 \cdot nH_2O$ ($0 \leq n \leq 20$))

Into an aqueous solution containing 0.52 mol/dm$^3$ of manganese sulfate and 0.26 mol/dm$^3$ of calcium nitrate, nitrogen gas was bubbled sufficiently. To 1 liter of this solution, 2 liters of 2.67 mol/dm$^3$ sodium hydroxide solution was added at a rate of 10 ml/min to obtain an aqueous alkaline solution of containing calcium hydroxide and manganese hydroxide (molar ratio=1:2). Then, to the solution, air was bubbled at a rate of 25 ml/min for three days. The resulting precipitate was washed with water, collected by filtration, and dried at 70° C. for 24 hours.

The resulting compound was found, by composition analysis, to be a manganese oxide containing Ca and Mn in a molar ratio of 1:2, having an oxidation degree of Mn of x=1.75 in terms of $MnO_x$, and represented by the formula $CaMn_2O_4 \cdot 3H_2O$.

Figure 19:
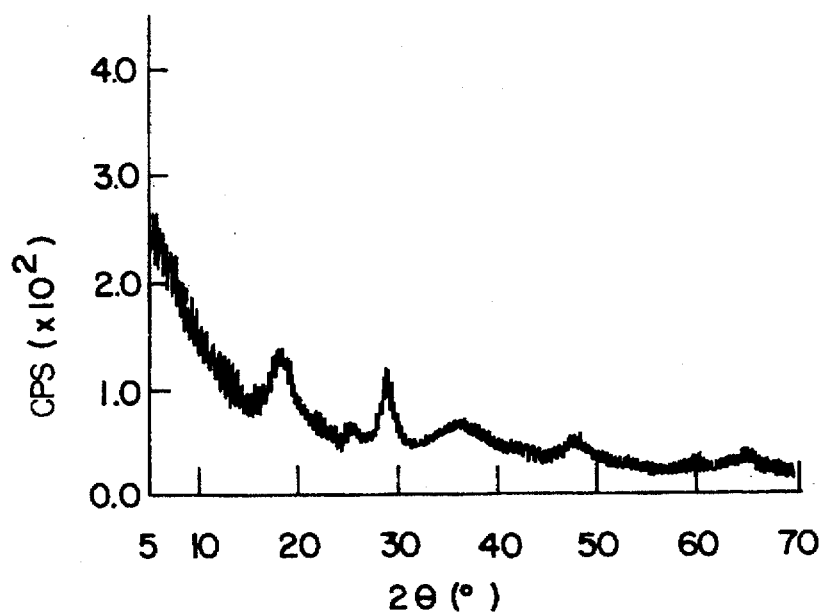
FIG. 19 is an X-ray diffraction pattern of $CaMn_2O_3.3H_2O$ prepared in Example 9.

According to X-ray diffraction measurement (X-ray source: Cu-Kα line), this compound was found to be an amorphous manganese oxide exhibiting broad and very weak X-ray diffraction peaks around the diffraction angles corresponding to the d-values of the interplanar spacings of 4.8 angstroms and 3.1 angstroms only. FIG. 19 shows the X-ray diffraction pattern of this manganese oxide. Table 5 shows the X-ray diffraction pattern data of this compound. For comparison, X-ray diffraction pattern data of $CaMn_2O_4$ described in ASTM card is shown also in Table 5.

From Table 5, the manganese oxide obtained by the present invention is a novel material which is completely different from the known spinel type $CaMn_2O_4$.

(Removal of Ca-Preparation of $Ca_xMn_2O_4 \cdot nH_2O$ ($0 \leq x < 1$, $0 \leq n \leq 20$))

Figure 20:
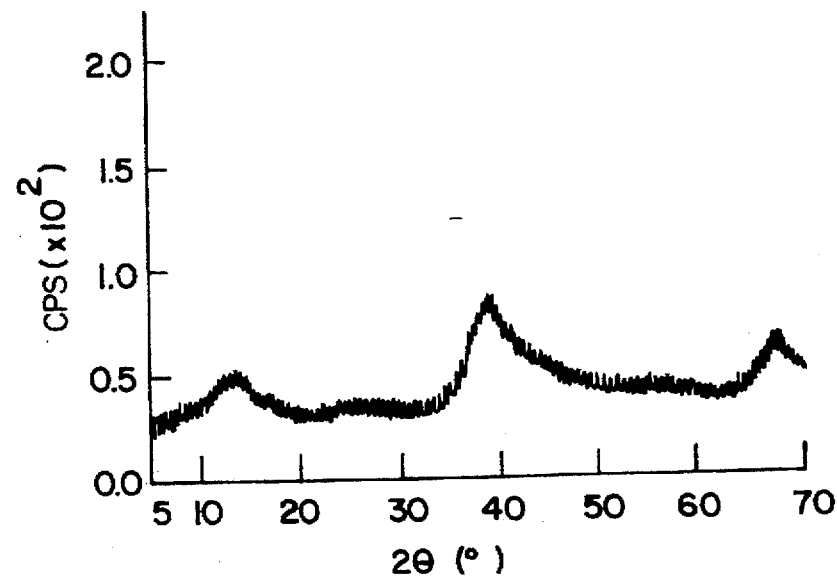
FIG. 20 is an X-ray diffraction pattern of $Ca_{0.19}Mn_2O_4.0.4H_2O$ prepared in Example 9.

5 Grams of the powdery $CaMn_2O_4 \cdot 3H_2O$ obtained above was added to 250 ml of aqueous 0.5 mol/dm$^3$ ammonium persulfate solution, and the mixture was stirred at 70° C. for 4 hours. The product was washed with water, collected by filtration, and dried at 70° C. for 24 hours. The resulting compound was found to be $Ca_{0.19}Mn_2O_4 \cdot 0.4H_2O$ from composition analysis, and to have an oxidation degree of x=1.80 in terms of $MnO_x$ by valence measurement of Mn. Further, this compound was found to have a δ type crystal structure by X-ray diffraction measurement. The X-ray diffraction pattern is shown in FIG. 20.

(Construction Electric Cell)

A three-electrode cell was constructed in the same manner as in Example 1 except for using the above $Ca_{0.19}Mn_2O_4 \cdot 0.4H_2O$ as the test electrode 2, and the cyclic voltammetry was conducted in the same manner as in Example 1. Table 6 shows the reduction capacity (equivalent to discharge capacity), the peak current value, and average output derived from the tenth cycle of the cyclic voltammetry.

EXAMPLE 10

A manganese oxide was synthesized in the same manner as in Example 9 except that 0.52 mol/dm$^3$ manganese nitrate solution and 0.26 mol/dm$^3$ calcium nitrate solution were used and oxygen was bubbled in place of air.

The resulting compound was found, by composition analysis, to be a manganese oxide containing Ca and Mn in a molar ratio of 1:2, having an oxidation degree of Mn of x=1.75 in terms of $MnO_x$, and represented by the formula $CaMn_2O_4 \cdot 2.3H_2O$.

Figure 21:
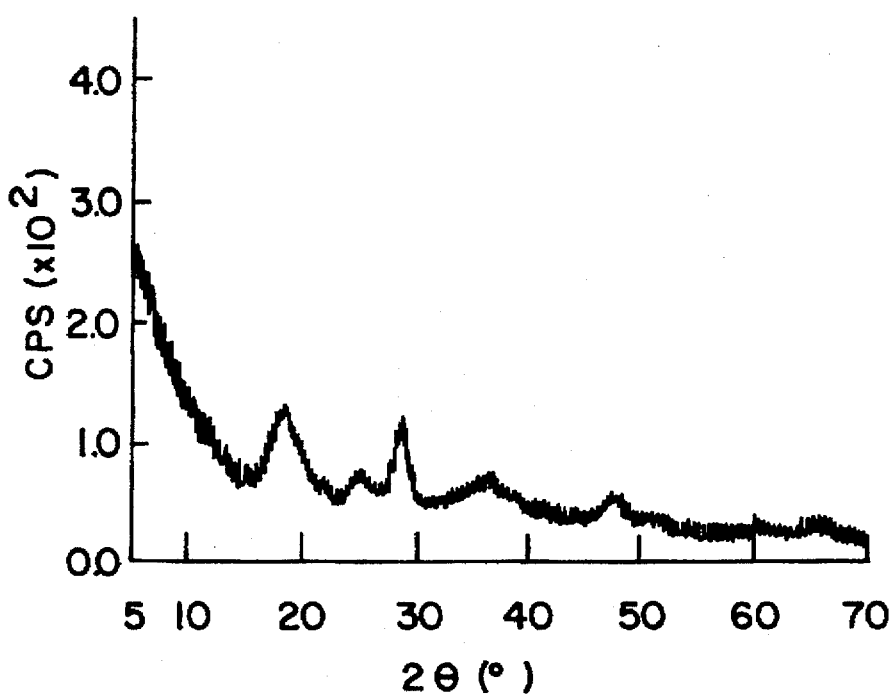
FIG. 21 is an X-ray diffraction pattern of $CaMn_2O_4.2.3H_2O$ prepared in Example 10.

According to X-ray diffraction measurement (X-ray source: Cu-Kα line), this compound was found to be an amorphous manganese oxide exhibiting broad and very weak X-ray diffraction peaks around the diffraction angles corresponding to the d-values of the interplanar spacings of 4.8 angstroms and 3.1 angstroms only. FIG. 21 shows the X-ray diffraction pattern of this manganese oxide. Table 5 shows the x-ray diffraction pattern data of this compound. From Table 5, the manganese oxide obtained by the present invention is a novel material which is completely different from the known spinal type $CaMn_2O_4$.

Figure 22:
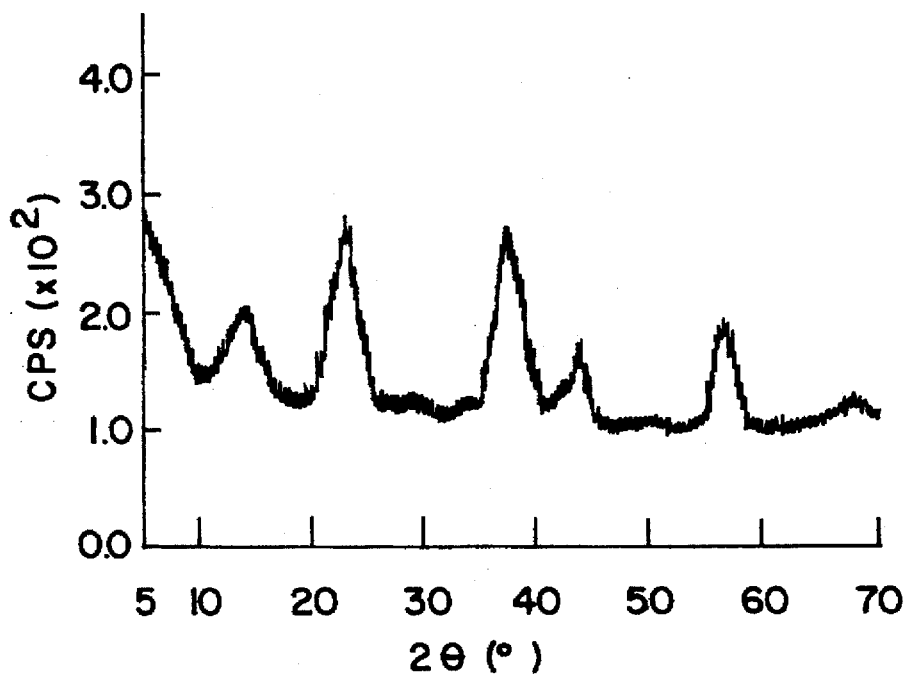
FIG. 22 is an X-ray diffraction pattern of $Ca_{0.10}Mn_2O_4.0.3H_2O$ prepared in Example 10.

Then 5 g of powdery $CaMn_2O_4 \cdot 2.3H_2O$ obtained above was further treated in the same manner as in Example 9. The compound obtained by this treatment was found to be a manganese oxide of δ type crystal structure represented by composition formula: $Ca_{0.10}Mn_2O_4 \cdot 0.3H_2O$, having an oxidation degree of Mn of x=1.95 in terms of $MnO_x$. The X-ray diffraction pattern thereof is shown in FIG. 22.

A three-electrode cell was constructed in the same manner as in Example 1 except for using the above manganese oxide $Ca_{0.10}Mn_2O_4 \cdot 0.3H_2O$ having δ type crystal structure as the test electrode 2, and the cyclic voltammetry was conducted in the same manner as in Example 1. Table 6 shows the results.

COMPARATIVE EXAMPLE 5

A manganese oxide having δ type crystal structure was prepared as follows. One liter of aqueous 1 mol/dm$^3$ hydrochloric acid solution was added to 1 liter of aqueous 2 mol/dm$^3$ potassium permanganate solution, and the mixture was stirred for 2 hours. The formed precipitate was collected by filtration, and washed with water until the washing water became neutral to obtain a reddish brown powder. The powder was dried at 70° C. for 24 hours, and then treated at 250° C. for 20 hours in the atmosphere.

Figure 23:
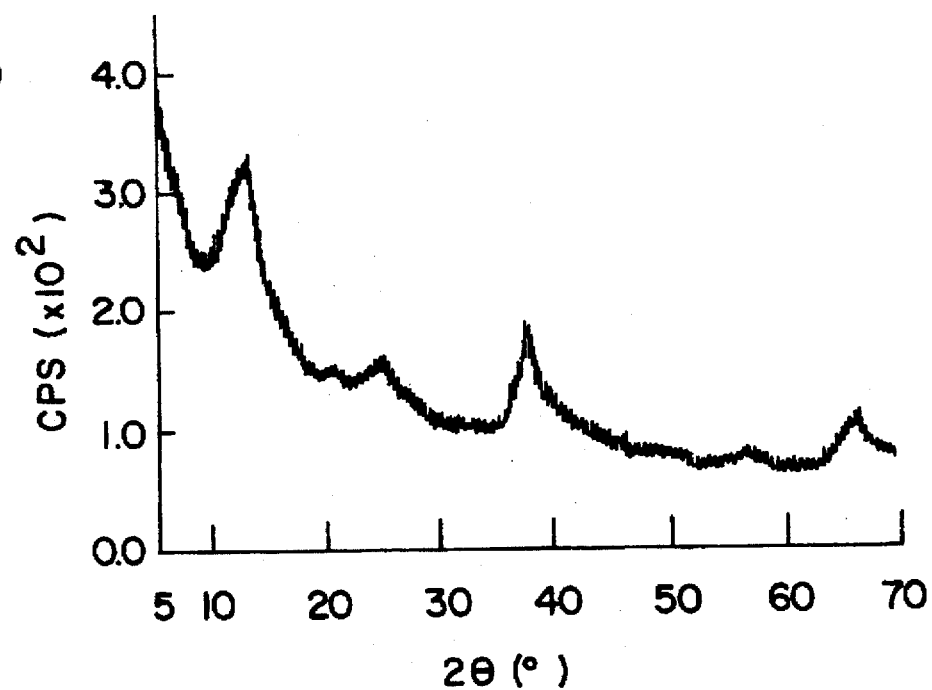
FIG. 23 is an X-ray diffraction pattern of $MnO_{1.83}$ having δ type crystal structure prepared in Comparative Example 5.

From composition analysis and X-ray diffraction of the powder, the resulting compound was found to be $MnO_{1.83}$ having δ type crystal structure. FIG. 23 shows the X-ray diffraction pattern thereof, Then 5 g of the obtained compound was further treated in the same manner as in Example, and was found to be a ordinally manganese oxide of δ type crystal structure.

EXAMPLE 11

A manganese oxide represented by the general formula $Co_xMn_2O_4$ ($0 < x \leq 1$) as follows.

(Preparation of $CoMn_2O_4$)

Into 1 liter of an aqueous solution containing 0.52 mol/dm$^3$ of manganese sulfate and 0.26 mol/dm$^3$ of cobalt sulfate, nitrogen gas was bubbled sufficiently. To 1 liter of the solution, 2 liters of 2.67 mol/dm$^3$ sodium hydroxide solution was added at a rate of 10 ml/min to obtain an aqueous alkaline solution of containing cobalt hydroxide and manganese hydroxide (molar ratio=1:2). Then, to the solution, air was bubbled at a rate of 25 ml/min for three days. The resulting precipitate was washed with water, collected by filtration, and dried at 70° C. for 24 hours.

The resulting compound was found, by composition analysis, to be a manganese oxide containing Co and Mn in a molar ratio of 1:2, and represented by the formula $CoMn_2O_4$.

Figure 24:
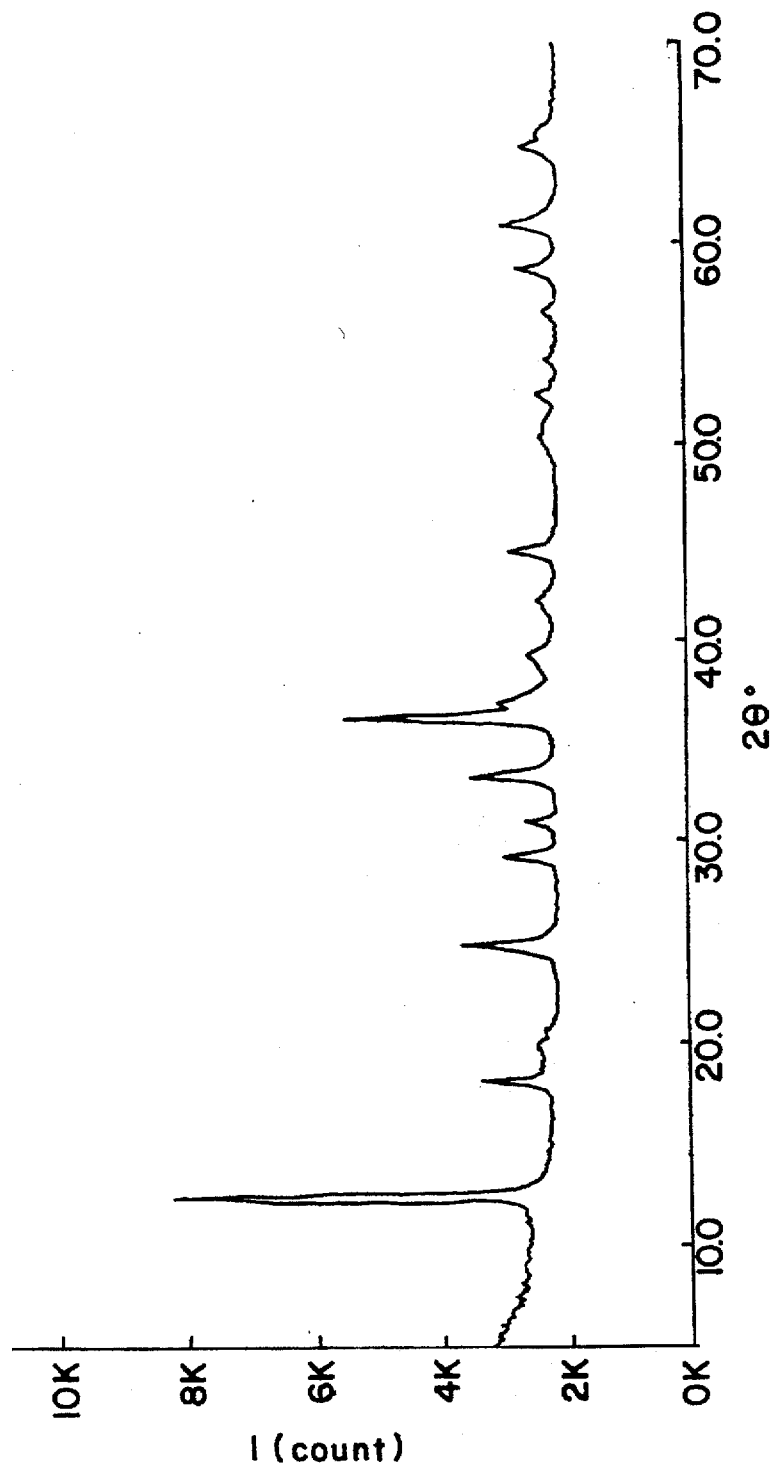
FIG. 24 is an X-ray diffraction pattern of $CoMn_2O_4$ prepared in Example 11.

According to X-ray diffraction measurement, this compound was found to have crystal structure of both layer type and spinal type. FIG. 24 shows the X-ray diffraction pattern of this manganese oxide.

(Removal of Co-Preparation Of $Co_xMn_2O_4$ (0<x<1))

Figure 25:
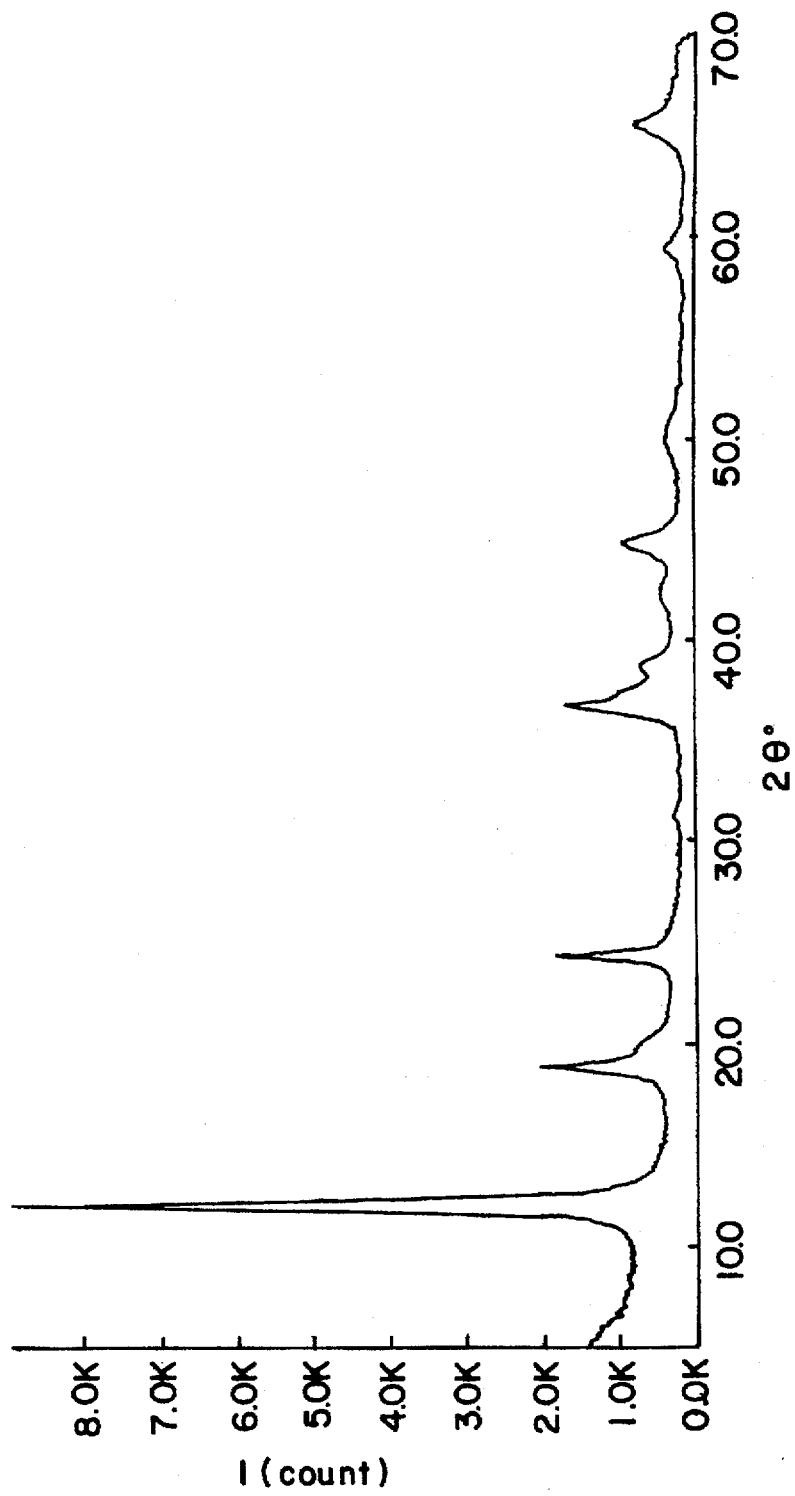
FIG. 25 is an X-ray diffraction pattern of $Co_{0.80}Mn_2O_4$ prepared in Example 11.

5 Grams of the powdery $CoMn_2O_4$ obtained above was added to 250 ml of aqueous 0.5 mol/dm³ ammonium persulfate solution, and the mixture was stirred at 70° C. for 4 hours. The product was washed with water, collected by filtration, and dried at 70° C. for 24 hours. The resulting compound was found to be $Co_{0.80}Mn_2O_4$ from composition analysis. Further, this compound was found to have both crystal structure of layer type and λ type belonging to spinel type structure. The X-ray diffraction pattern is shown in FIG. 25.

(Construction of Electric Cell)

A three-electrode cell was constructed in the same manner as in Example 1 except for using, as the test electrode 2, the above $Co_{0.80}Mn_2O_4$ having both crystal structures of layer type and λ type belonging to spinel structure, and the cyclic voltammetry was conducted in the same manner as in Example 1. Table 7 shows the reduction capacity (equivalent to discharge capacity), the peak current value, and average output derived from tenth cycle of the cyclic voltammetry.

EXAMPLE 12

Figure 26:
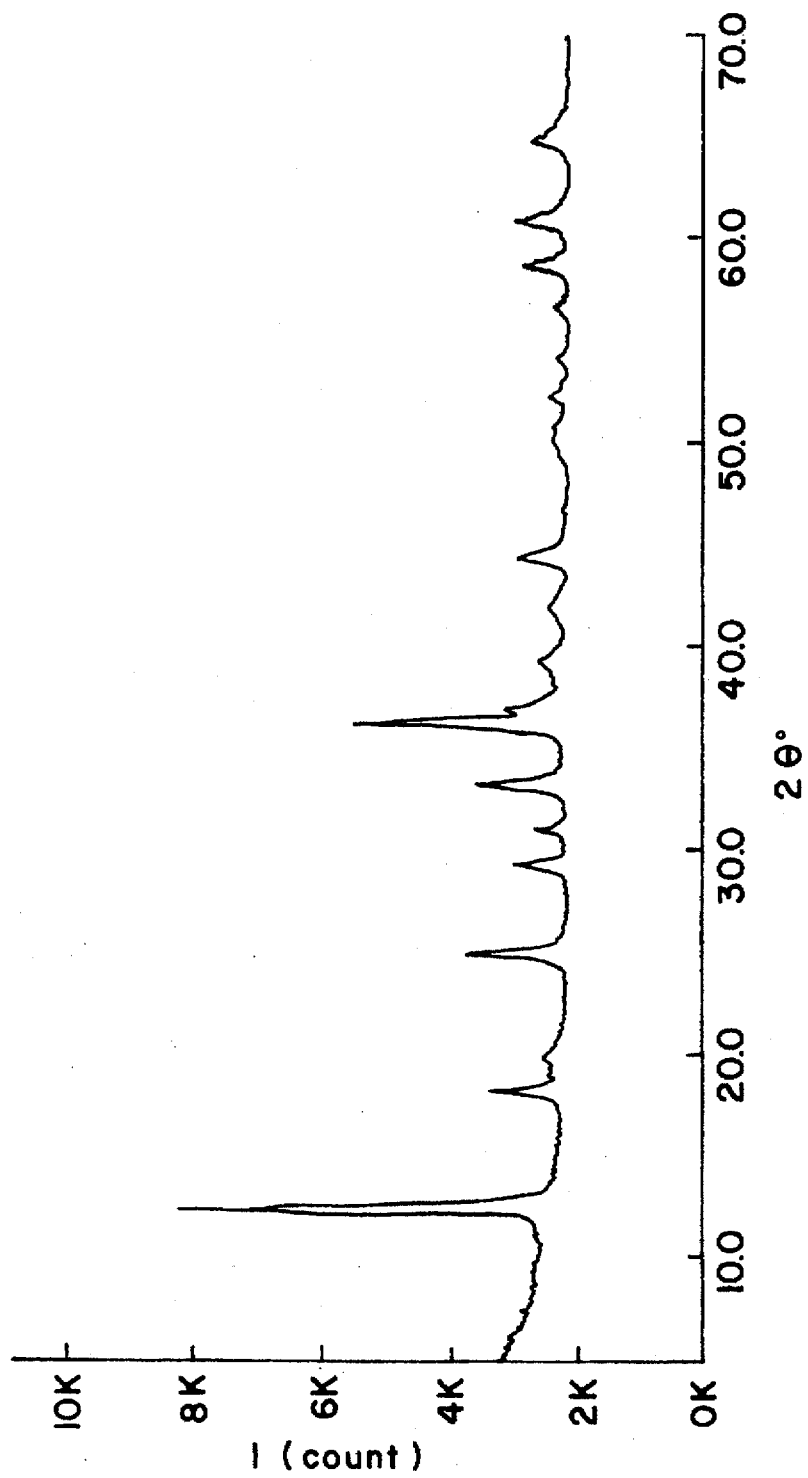
FIG. 26 is an X-ray diffraction pattern of $CoMn_2O_4$ prepared in Example 12.

A manganese oxide was prepared in the same manner as in Example 11 except for using 0.52 mol/dm³ manganese nitrate and 0.26 mol/dm³ cobalt nitrate. From composition analysis, the resulting compound was found to be a manganese oxide containing Co and Mn in a molar ratio of 1:2 and represented by the composition formula $CoMn_2O_4$. From X-ray diffraction measurement, the compound was found to have both layer type crystal structure and spinal type crystal structure simultaneously. FIG. 26 shows the X-ray diffraction pattern.

Figure 27:
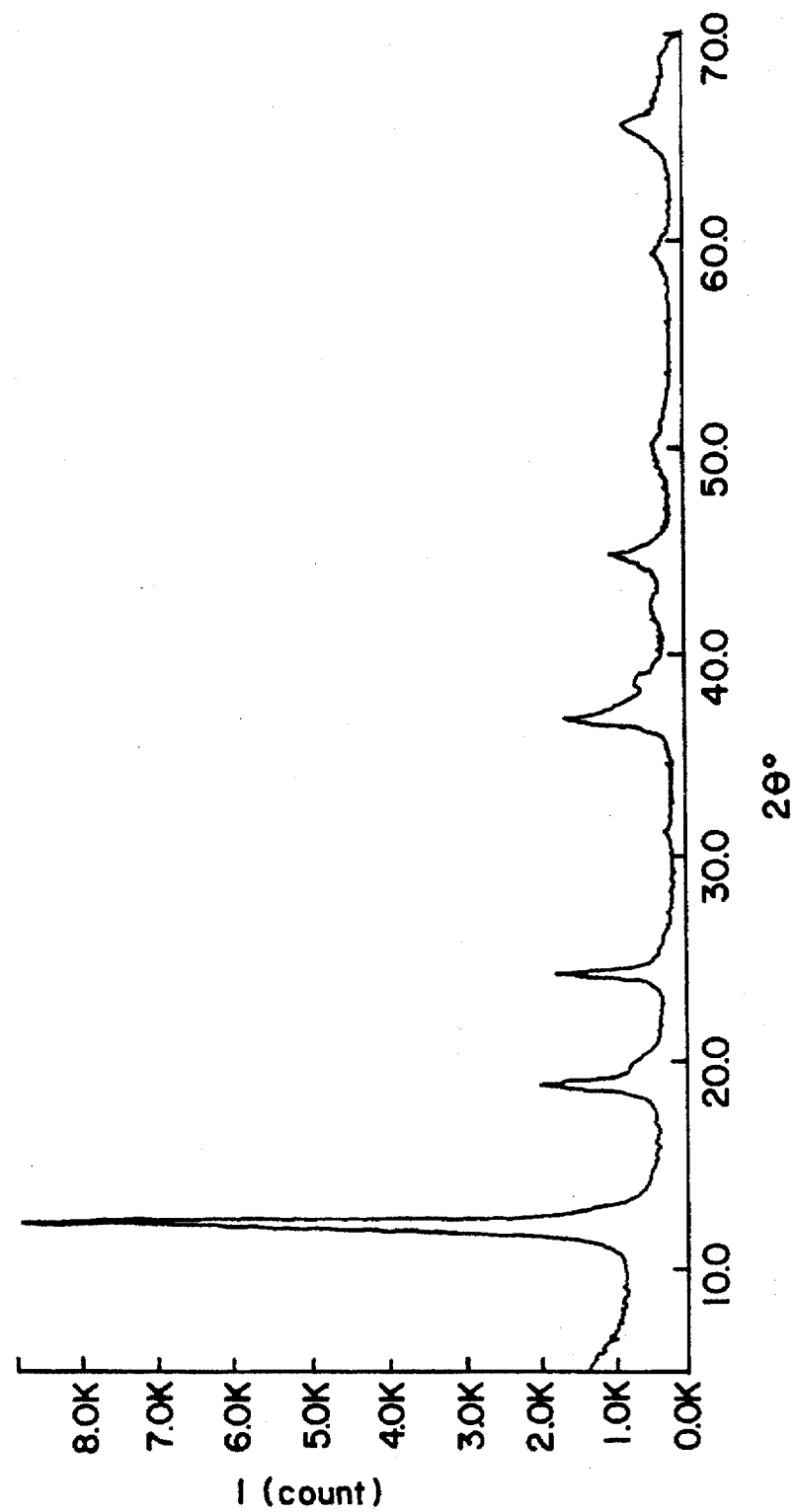
FIG. 27 is an X-ray diffraction pattern of $Co_{0.70}Mn_2O_4$ prepared in Example 12.

Then 5 g of powdery $CoMn_2O_4$ obtained above was further treated in the same manner as in Example 11. The compound obtained by this treatment was found to be represented by the formula $Co_{0.70}Mn_2O_4$. From the X-ray diffraction measurement. this compound has both crystal structure of layer type and λ type assignable to spinel structure. The X-ray diffraction pattern is shown in FIG. 27.

A three-electrode cell was constructed in the same manner as in Example 1 except for using, as the test electrode 2, the above $Co_{0.70}Mn_2O_4$ having both crystal structures of layer type and λ type belonging to spinel structure, and the cyclic voltammetry was conducted in the same manner as in Example 1. Table 7 shows the reduction capacity (equivalent to discharge capacity), the peak current value, and average output derived from tenth cycle of the cyclic voltammetry.

COMPARATIVE EXAMPLE 6

$CoMn_2O_4$ was prepared as follows. 15.8 Grams of powdery dimanganese trioxide ($Mn_2O_3$) end 10.3 g of powdery basic cobalt carbonate ($CoCO_3.Co(OH)_2$) was mixed enough with an agate mortar. The powdery mixture was heated at 900° C. for 20 hours by means of an open-air type electric furnace. The resulting compound was found to be $CoMn_2O_4$ having spinel type crystal structure by X-ray diffraction and composition analysis.

As described above, the present invention provides novel manganese oxides which have a spinel type, a layer type, or spinel-and-layer type crystal structure. the novel manganese oxides of the present invention are promising as a host compound for a battery-active substance, a catalyst, an adsorbent, a magnetic material and the like, Further, a lithium secondary battery is provided by use of a kind of the above manganese oxide for the positive electrode, exhibiting high output with high energy density and with satisfactory reversibility in charge-discharge cycle.

TABLE 1

Result of Composition Analysis

| | Mn (% by weight) | Zn (% by weight) | Composition |
|---|---|---|---|
| Example 1 | 50.5 | 20.1 | $Zn_{0.67}Mn_2O_4$ |
| Example 2 | 56.2 | 11.1 | $Zn_{0.33}Mn_2O_4$ |
| Example 3 | 60.9 | 3.6 | $Zn_{0.10}Mn_2O_4$ |
| Example 4 | 63.2 | — | $MnO_2$ |
| Example 5 | 60.9 | 3.6 | $Zn_{0.10}Mn_2O_4$ |
| Example 6 | 63.2 | — | $MnO_2$ |
| Comparative Example 1 | 60.5 | — | $MnO_2$ |
| Comparative Example 2 | 47.2 | 25.3 | $Zn_{0.90}Mn_2O_4$ |

TABLE 2

Evaluation of Battery Properties

| | Reduction capacity (mAh/g) | Peak current (mA/cm²) | Average output (mWh/cm²) |
|---|---|---|---|
| Example 1 | 10.5 | 10.1 | 14.7 |
| Example 2 | 12.9 | 12.6 | 18.1 |
| Example 3 | 14.3 | 14.8 | 21.6 |
| Example 4 | 16.7 | 15.9 | 22.2 |
| Example 5 | 14.9 | 15.0 | 21.7 |
| Example 6 | 16.9 | 16.0 | 22.4 |
| Comparative Example 1 | 3.6 | 3.6 | 4.7 |
| Comparative Example 2 | 3.5 | 4.9 | 6.4 |
| Comparative* Example 3 | 4.8 | 6.7 | 6.2 |

*Second peak value (higher voltage side)

TABLE 3

| Manganese oxide of Example 7 | | Manganese oxide of Example 8 | | $MgMn_2O_4$ | |
|---|---|---|---|---|---|
| Interplanar spacing (angstrom) | Relative intensity (Cu—Kα line) | Interplanar spacing (angstrom) | Relative intensity (Cu—Kα line) | Interplanar spacing (angstrom) | Relative itensity (CuKα line⁻) |
| 9.23 | 7 | 9.22 | 7 | 4.88 | 100 |
| 7.14 | 100 | 7.13 | 100 | 3.06 | 20 |
| 5.00 | 10 | 5.00 | 10 | 2.86 | 10 |
| 3.56 | 35 | 3.65 | 35 | 2.74 | 70 |
| 2.51 | 5 | 2.51 | 5 | 2.47 | 90 |
| 2.43 | 6 | 2.42 | 6 | 2.44 | 20 |

TABLE 4

Evaluation of Battery Properties

| | Reduction capacity (mAh/g) | Peak current (mA/cm²) | Average output (mWh/cm²) |
|---|---|---|---|
| Example 7 | 7.5 | 7.1 | 10.3 |
| Example 8 | 9.3 | 8.8 | 12.7 |
| Comparative | 3.4 | 4.7 | 4.3 |

TABLE 4-continued

Evaluation of Battery Properties

| | Reduction capacity (mAh/g) | Peak current (mA/cm$^2$) | Average output (mWh/cm$^2$) |
|---|---|---|---|
| Example 4 Table 5 | | | |

TABLE 5

| Manganese oxide of Example 9 | | Manganese oxide of Example 10 | | CaMn$_2$O$_4$ | |
|---|---|---|---|---|---|
| Interplanar spacing (angstrom) | Relative intensity (Cu—Kα line) | Interplanar spacing (angstrom) | Relative intensity (Cu—Kα line) | Interplanar spacing (angstrom) | Relative itensity (CuKα line) |
| ca 4.8 | — | ca 4.8 | — | 4.82 | 30 |
| ca 3.1 | — | ca 3.1 | — | 2.69 | 100 |
| | | | | 2.22 | 100 |
| | | | | 2.05 | 100 |

TABLE 6

Evaluation of Battery Properties

| | Reduction capacity (mAh/g) | Peak current (mA/cm$^2$) | Average output (mWh/cm$^2$) |
|---|---|---|---|
| Example 9 | 7.2 | 8.5 | 11.7 |
| Example 10 | 8.9 | 8.7 | 12.2 |

TABLE 7

Evaluation of Battery Properties

| | Reduction capacity (mAh/g) | Peak current (mA/cm$^2$) | Average output (mWh/cm$^2$) |
|---|---|---|---|
| Example 11 | 12.9 | 12.6 | 18.1 |
| Example 12 | 13.5 | 12.8 | 18.4 |

What is claimed is:

1. A manganese oxide represented by the general formula $A_xMn_2O_4 \cdot nH_2O$, where A is selected from the group consisting of Zn, Mg, Ca and Co; and if A is Zn, $0.1 < x < 0.67$, $n=0$ and said manganese oxide has a spinel crystal structure; if A is Mg, $0 < x < 1$, $0 \leq n \leq 20$, said manganese oxide has a layer crystal structure having interplanar spacings 9.23±0.05 angstrom 7.14±0.05 angstrom 5.00±0.05 angstrom 3.56±0.05 angstrom 2.51±0.05 angstrom and 2.48±0.05 angstrom;

if A is Ca, x is 1 or $0.1 < x < 0.19$, and $0 \leq n \leq 20$, said manganese oxide has an amorphous crystal structure when x=1 having interplanar spacings 4.8±0.05 angstrom 3.1±0.05 angstrom and said manganese oxide has a δ crystal structure when $0.1 < x < 0.19$; and if A is Co, $0.7 < x < 0.8$, $n=0$ and said manganese oxide has a mixed crystal structure of both a layer and a spinel.

2. The manganese oxide of claim 1, wherein A is Ca, x=1, and the manganese oxide has an amorphous crystal structure.

3. The manganese oxide of claim 1, wherein A is Ca, $0.1 < x < 0.19$, and the manganese oxide has a δ crystal structure.

4. The manganese oxide of claim 1, wherein A is Zn and said manganese oxide has a BET specific surface area of not less than 100 m$^2$/g.

5. The manganese oxide of claim 1, wherein A is Zn.

6. The manganese oxide of claim 1, wherein A is Mg.

7. The manganese oxide of claim 1, wherein said compound has a reduction capacity, when used as an electrode in a battery and subjected to repeated oxidation-reduction, within the range of from 7.2 to 16.9 mAh/g.

8. The manganese oxide of claim 1, wherein said compound has a peak current, when used as an electrode in a battery and subjected to repeated oxidation-reduction, within the range of from 7.1 to 16.0 mA/cm$^2$.

9. The manganese oxide of claim 1, wherein said compound has an average output, when used as an electrode in a battery and subjected to repeated oxidation-reduction, within the range of from 10.3 to 22.4 mWh/cm$^2$.

* * * * *